(12) United States Patent
Laska et al.

(10) Patent No.: US 12,129,646 B2
(45) Date of Patent: Oct. 29, 2024

(54) MECHANICAL NON-BINARY SWAY TILE DISPLAY

(71) Applicant: BREAKFAST, LLC, Brooklyn, NY (US)

(72) Inventors: Andrew Laska, Brooklyn, NY (US); Andrew Zolty, Brooklyn, NY (US); Mattias Gunneras, Brooklyn, NY (US); Andrew McIntyre, Brooklyn, NY (US); Brandon Orr, Brooklyn, NY (US); Will Rigby, Brooklyn, NY (US); Michael Fazio, Brooklyn, NY (US); Mohammad Hosein Asgari, Brooklyn, NY (US); Lee Marom, Brooklyn, NY (US); Sebastian Schloesser, Brooklyn, NY (US)

(73) Assignee: BREAKFAST, LLC, Brooklyn, NY (US)

(*) Notice: Subject to any disclaimer, the term of this patent is extended or adjusted under 35 U.S.C. 154(b) by 281 days.

(21) Appl. No.: 17/869,731

(22) Filed: Jul. 20, 2022

(65) Prior Publication Data
US 2023/0025141 A1 Jan. 26, 2023

Related U.S. Application Data

(60) Provisional application No. 63/223,854, filed on Jul. 20, 2021.

(51) Int. Cl.
  *E04B 1/34* (2006.01)
  *E04B 1/32* (2006.01)
  *E04B 1/343* (2006.01)
  *E04B 1/84* (2006.01)

(52) U.S. Cl.
  CPC ............ *E04B 1/343* (2013.01); *E04B 1/3211* (2013.01); *E04B 1/8409* (2013.01)

(58) Field of Classification Search
  CPC ...... E04B 1/343; E04B 1/3211; E04B 1/8409; G09F 9/37; G09F 9/02; F16M 11/043; F16M 11/12; F16M 11/18; F16M 13/02
  See application file for complete search history.

(56) References Cited

U.S. PATENT DOCUMENTS

| | | | |
|---|---|---|---|
| 2013/0321394 A1* | 12/2013 | Fisher .................... | G09G 3/003 345/419 |
| 2014/0267457 A1* | 9/2014 | Jurewicz ............. | G06F 3/04845 361/729 |
| 2020/0219424 A1* | 7/2020 | Duarte .................. | G09F 9/3026 |

* cited by examiner

*Primary Examiner* — Mark R Wendell
(74) *Attorney, Agent, or Firm* — Run8 Patent Group, LLC; Peter Miller

(57) ABSTRACT

One variation of the tile display includes a set of tile assemblies, each tile assembly includes: a base plate; a tile panel; a tile interface; and a set of linear actuator assemblies arranged in a radial pattern about the base plate and cooperating to constrain the tile panel in angular roll, linear heave, and linear sway motion relative to the base plate. Each linear actuator assembly includes: a bearing housing defining a linear bearing, a floating bearing, and a through-hole; an actuator mounted to the bearing housing; a distal link coupled to the tile interface; a first support boom running through the linear bearing; a second support boom running through the floating bearing; and a driven boom running through the through-hole of the bearing housing. Each tile assembly also includes a primary controller configured to maneuver tile panels over ranges of angular pitch, angular yaw, and linear surge positions.

20 Claims, 9 Drawing Sheets

MECHANICAL NON-BINARY SWAY TILE DISPLAY

CROSS-REFERENCE TO RELATED APPLICATIONS

This Application claims the benefit of U.S. Provisional Application No. 63/223,854, filed on 20 Jul. 2021, which is incorporated in its entirety by this reference.

This Application is related to U.S. patent application Ser. No. 15/824,244, filed on 28 Nov. 2017, and Ser. No. 17/067,117, filed on 9 Oct. 2020, each of which is incorporated in its entirety by this reference.

TECHNICAL FIELD

This invention relates generally to mechanical displays and more specifically to a new and unique mechanical non-binary sway tile display in the field of mechanical displays.

DESCRIPTION OF THE EMBODIMENTS

Figure 1A:
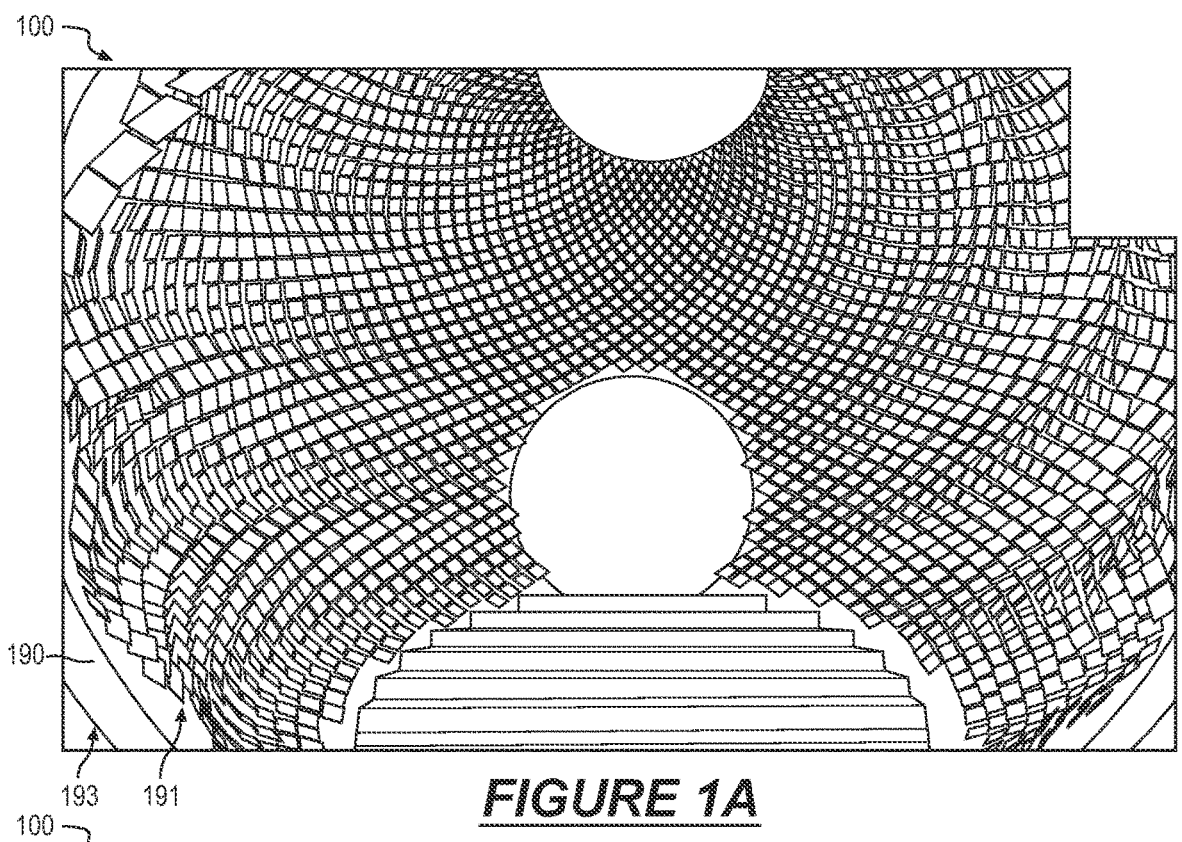
FIGS. 1A and 1B are schematic representations of a system.
Figure 1B:
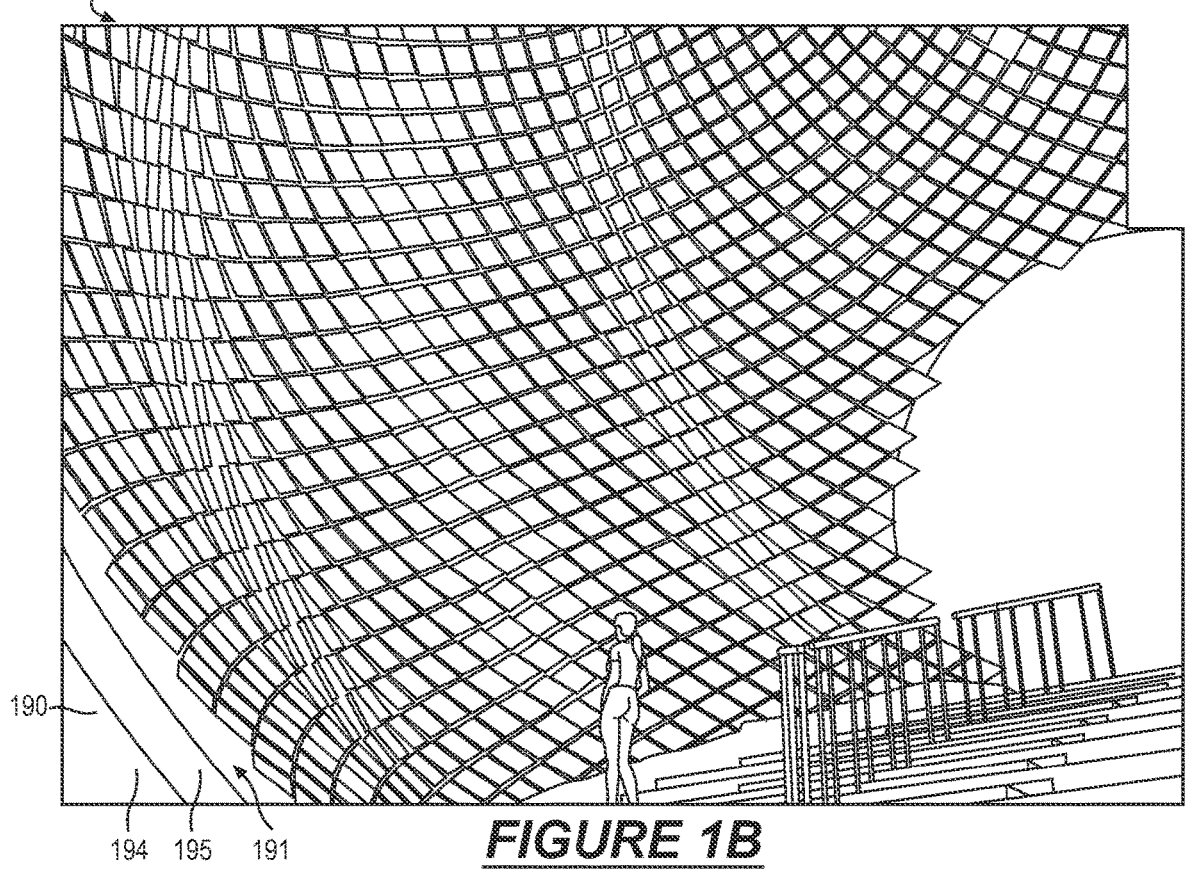
Figure 2:
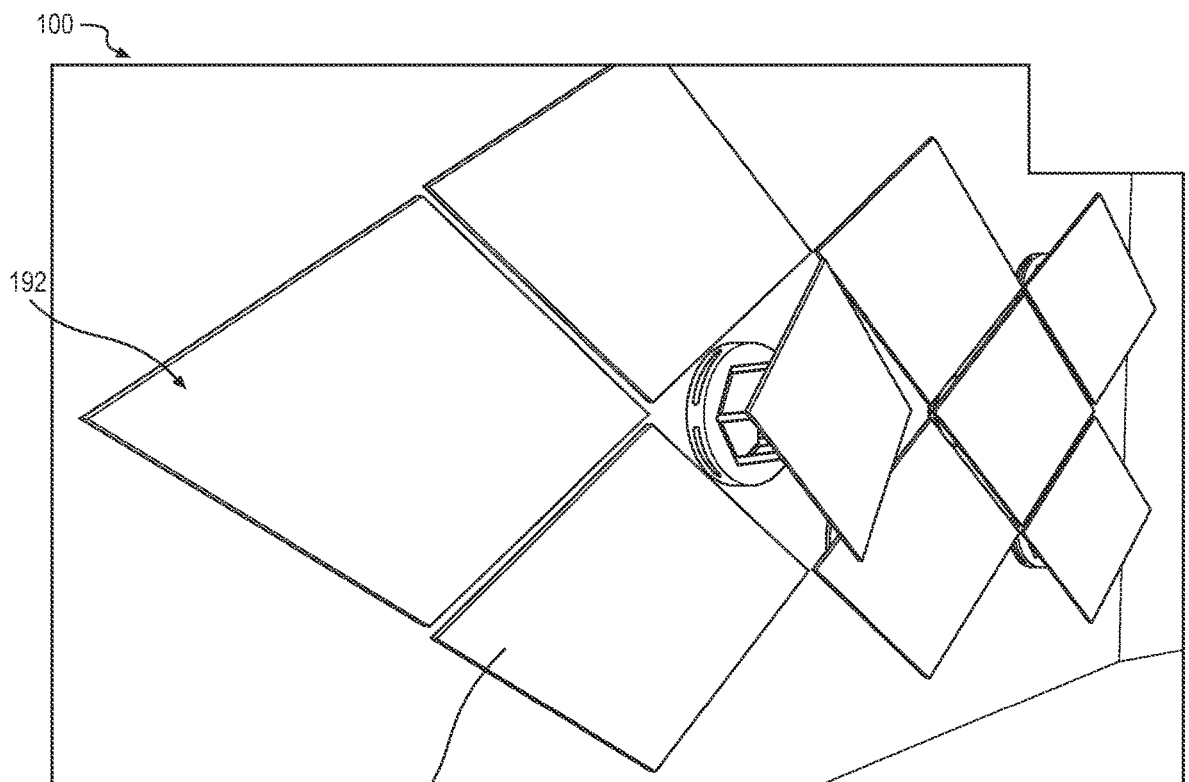
FIG. 2 is a schematic representation of one variation of the system.
Figure 3:
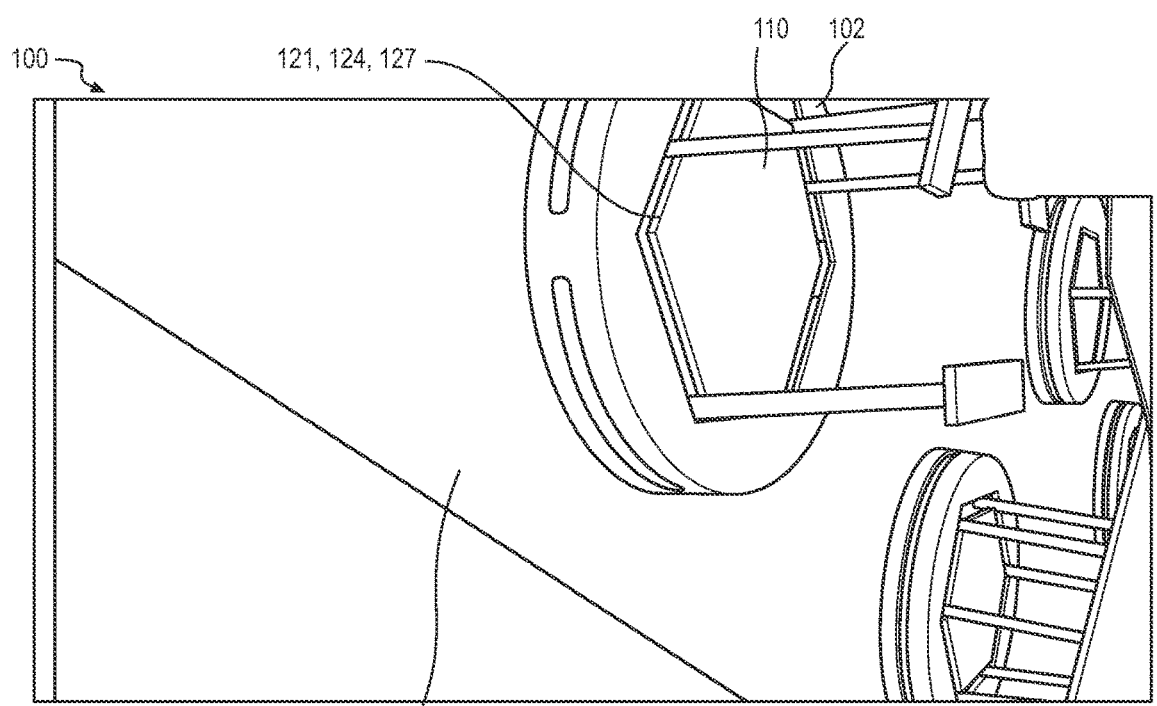
FIG. 3 is a schematic representation of one variation of the system.
Figure 4:
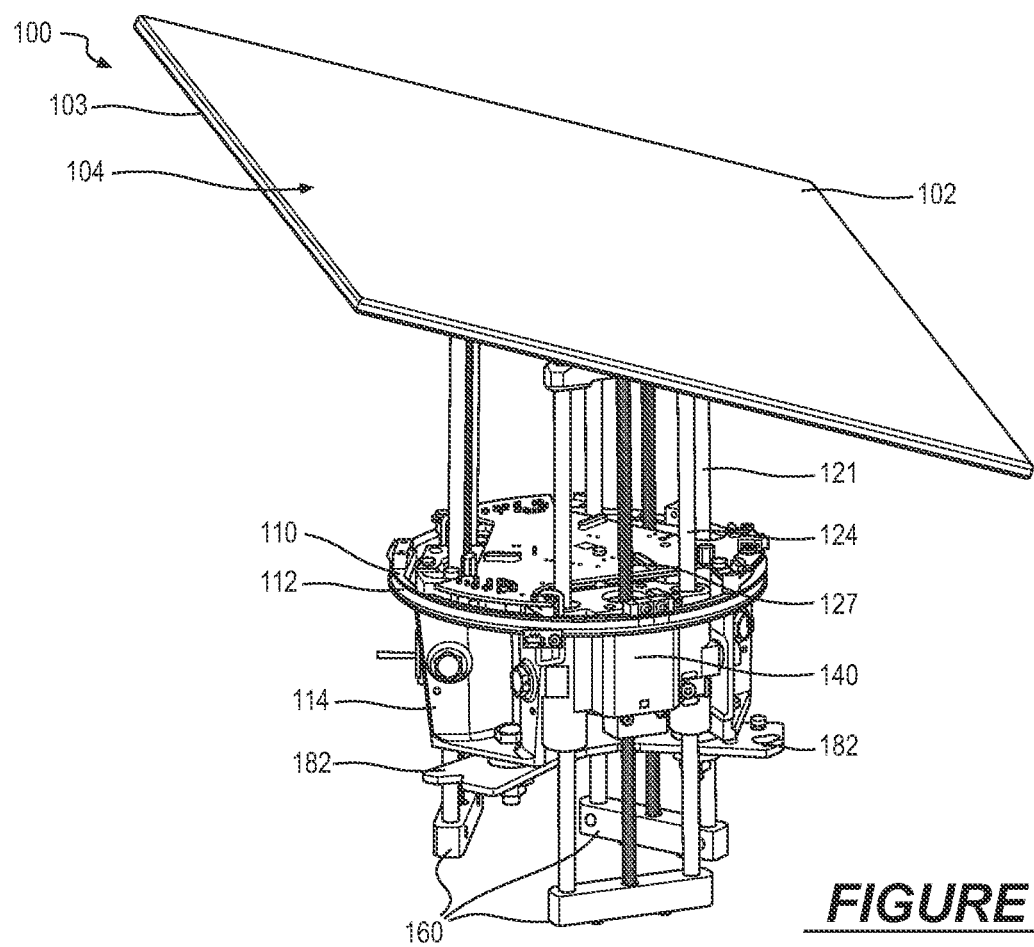
FIG. 4 is a schematic representation of one variation of the system.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

As shown in FIGS. 1-12 a system 100 includes: a set of tile assemblies 102 mounted to a support structure 190 to form a multi-pixel, non-planar, sway tile display; and a primary controller 108.

A tile assembly 102 includes: a base plate 110; a tile panel 103; a tile interface 106 coupled to a rear face 105 of the tile panel 103; a set of linear actuator assemblies 120 pivotably coupled to and radially offset above the base plate 110, pivotably coupled to and radially offset above the tile interface 106, and configured to constrain the tile panel 103 in angular roll, linear heave, and linear sway motion relative to the base plate 110; and a local controller 164 configured to extend and retract the set of linear actuator assemblies 120 to maneuver the tile panel 103 over ranges of angular pitch, angular yaw, and linear surge positions relative to the base plate 110 according to an actuation routine.

The support structure 190: defines a non-planar surface; and includes an array of tile receptacles 192 distributed across the non-planar surface. Each tile receptacle includes: a mounting feature configured to retain a base plate 110 of a tile assembly 102; and a set of apertures configured to pass proximal ends of a set of linear actuator assemblies 120 in the tile assembly 102.

The primary controller 108: is coupled to local controllers 164 in the set of tile assemblies (e.g., via a set of column controllers 166); and is configured to serve sequences of actuation routines to local controllers 164 in the set of tile assemblies.

One variation of the system 100 includes a set of tile assemblies 102, each tile assembly 102 in the set of tile assemblies 102 includes: a base plate 110; a tile panel 103; a tile interface 106 coupled to a rear face 105 of the tile panel 103; and a set of linear actuator assemblies 120 arranged in a radial pattern about the base plate 110 and cooperating to constrain the tile panel 103 in angular roll, linear heave, and linear sway motion relative to the base plate 110. Each linear actuator assembly 120 in the set of linear actuator assemblies 120 includes: a bearing housing 130 defining a linear bearing 132, defining a floating bearing 134 parallel to and laterally offset from the linear bearing 132, defining a through-hole 136 arranged between the linear bearing 132 and the floating bearing 134, and configured to pivot on the base plate 110 about a pivot axis perpendicular to the linear bearing 132 and the floating bearing 134; an actuator mounted to the bearing housing 130; a distal link 150 pivotably coupled to the tile interface 106; a first support boom 121 running through the linear bearing 132 and coupled to a first lateral side 152 of the distal link 150; a second support boom 124 running through the floating bearing 134 and coupled to a second lateral side 154 of the distal link 150 opposite the first lateral side 152; and a driven boom 127. The driven boom 127: runs through a through-hole 136 of the bearing housing 130; extends through the actuator 140; is coupled to the distal link 150 between the first lateral side 152 and the second lateral side 154; and is driven linearly parallel to the first support boom 121 and the second support boom 124 by the actuator 140. The system 100 also includes a primary controller 108 configured to trigger sets of linear actuator assemblies 120 in the set of tile assemblies to maneuver tile panels 103 over ranges of angular pitch, angular yaw, and linear surge positions according to an actuation routine.

Another variation of the system 100 includes: a set of tile assemblies 102 including pairs of adjacent tile assemblies, each tile assembly 102 in a pair of adjacent tile assemblies includes: a base plate 110; a tile panel 103; a tile interface 106 coupled to a rear face 105 of the tile panel 103; and a set of linear actuator assemblies 120 arranged in a radial pattern about the base plate 110 and cooperating to constrain the tile panel 103 in angular roll, linear heave, and linear sway motion relative to the base plate 110. Each linear actuator assembly 120 in the set of linear actuator assemblies 120 includes: a bearing housing 130 defining a linear bearing 132, defining a floating bearing 134 parallel to and laterally offset from the linear bearing 132, defining a through-hole 136 arranged between the linear bearing 132 and the floating bearing 134, and configured to pivot on the base plate 110 about a pivot axis perpendicular to the linear bearing 132, the through-hole 136, and the floating bearing 134; an actuator mounted to the bearing housing 130; a distal link 150 pivotably coupled to the tile interface 106; a proximal lateral link 160 opposite the distal link 150; a first support boom 121 running through the linear bearing 132 and coupled to a first lateral side 152 of the distal link 150; a second support boom 124 running through the floating bearing 134 and coupled to a second lateral side 154 of the distal link 150 opposite the first lateral side 152; and a driven boom 127. The driven boom 127 also includes: extending through the bearing housing 130 and running through the actuator; coupled to the distal link 150 between the first lateral side 152 and the second lateral side 154; and driven linearly parallel to the first support boom 121 and the second support boom 124 by the actuator. The system 100 also includes a primary controller 108: coupled to local controllers 164 in pairs of adjacent tile assemblies; and configured to serve sequences of actuation routines to local controllers 164 in the set of tile assemblies to trigger sets of linear actuator assemblies 120 to maneuver tile panels 103, in the set of tile assemblies, over ranges of angular pitch, angular yaw, and linear surge positions according to sequences of actuation routines.

One variation of the system 100 includes a set of tile assemblies 102, each tile assembly 102 in the set of tile assemblies includes: a base plate 110; a tile panel 103; a tile interface 106 coupled to a rear face 105 of the tile panel 103; a bearing mount plate 170 arranged between the base plate 110 and the tile interface 106; and a set of linear actuator assemblies 120 arranged in a radial pattern about the base plate 110 and cooperating to constrain the tile panel 103 in angular roll, linear heave, and linear sway motion relative to the base plate 110. Each linear actuator assembly 120 in the set of linear actuator assemblies 120 includes: a bearing housing 130 defining a linear bearing 132, defining a floating bearing 134 parallel to and laterally offset from the linear bearing 132, and configured to pivot on the base plate 110 about a pivot axis perpendicular to the linear bearing 132 and the floating bearing 134; an actuator mounted to the bearing housing 130; a distal link 150 pivotably coupled to the bearing mount plate 170; a proximal lateral link 160 arranged opposite the distal link 150; a first support boom 121 running through the linear bearing 132 and defining a first end 122 coupled to a first lateral side 152 of the distal link 150 and a second end 123 coupled to the proximal lateral link 160; a second support boom 124 running through the floating bearing 134 and defining a third end 125 coupled to a second lateral side 154 of the distal link 150 opposite the first lateral side 152 and a fourth end 126 coupled to the proximal lateral link 160; and a driven boom 127. The driven boom 127 also: extends through the bearing housing 130 and runs through the actuator; defines a fifth end 128 coupled to the distal link 150 between the first lateral side 152 and the second lateral side 154 and a sixth end 129 coupled to the proximal lateral link 160; and is driven linearly parallel to the first support boom 121 and the second support boom 124 by the actuator. The system 100 also includes a primary controller 108 configured to trigger sets of linear actuator assemblies 120 to maneuver tile panels 103, in the set of tile assemblies, over ranges of angular pitch, angular yaw, and linear surge positions according to an actuation routine.

2. Applications

Generally, a tile assembly 102 represents an independently operable, non-binary mechanical "pixel" configured to store a sequence of non-binary values representing a range of pixel positions (i.e., pitch, yaw, and surge positions) and configured to autonomously manipulate a physical pixel (i.e., a tile panel 103) element according to this sequence of values. In particular, a tile assembly 102 can include: a tile panel 103 that forms a visible pixel element; a set of (e.g., three) linear actuator assemblies 120 that cooperate to rotate the tile panel 103 over a range of pitch orientations, to rotate the tile panel 103 over a range of yaw orientations, and to translate the tile panel 103 over a range of surge positions relative to a base plate 110; and a local controller 164 configured to drive the linear actuators based on a sequence of values (e.g., pitch, yaw, and surge positions) contained in an actuation routine uploaded and stored in local memory on the tile assembly 102.

Furthermore, an array of tile assemblies can be installed into an array of tile receptacles 192 on a vertical surface, a horizontal surface, or a non-planar surface (e.g., on the inside of a semi-spherical dome) to form a multi-pixel display in which individual pixels can pitch, yaw, and surge independently or with other pixels nearby to (re)play a visual episode.

Tile assemblies in this system 100 (hereinafter "a set of tile assemblies 102") can be grouped into columns, rows, or clusters, each fed actuation routines and/or controlled by a column controller 166; and each column controller 166 can be connected to and controlled by a primary controller 108.

More specifically, though a tile panel 103 within a tile assembly 102 defines a single outer visible face, the tile assembly 102 can drive and hold the tile panel 103 over a range of angular pitch, angular yaw, and linear surge positions in which the tile panel 103 appears in different displays (e.g., different reflections, glare, or width of negative space between the tile panel 103 and a tile panel 103 in an adjacent tile assembly) to an observer. Tile assemblies installed on a support structure 190 can thus, independently and autonomously, execute (unique or semi-unique) actuation routines—received from the primary and corresponding column controllers 166—to form an animated mechanical display that represents non-binary pixel values in multiple domains (e.g., red, green, and blue color values from "0" to "255" in a sequence of video frames) by locating corresponding tile panels 103 over a range of angular pitch, angular yaw, and linear surge positions.

2.1 Vibration and Damping

Additionally, once the array of tile assemblies is installed into an array of tile receptacles 192 on a vertical surface, a horizontal surface, or a non-planar surface of a support structure 190 (e.g., on the inner face of a semi-spherical dome) to form the multi-pixel display, each tile assembly 102 may approximate an audio speaker such that the system approximates a large, multi-speaker assembly spanning the support structure 190. In particular, the tile panel 103 of a linear actuator assembly 140 approximates the diaphragm of the speaker; and the actuator 140 of the linear actuator assembly 120 approximates a speaker driver that introduces discontinuous motion (i.e., vibration) into the tile panel 103 via the driven boom 127. This discontinuous motion is transferred from the actuator 140 into the tile panel 103 via the driven boom and support booms of the linear actuator assembly.

Furthermore, the tile assembly 102 supports the tile panel 103 in a cantilevered configuration from the base plate 110. Thus, the tile panel 103 (e.g., a heaviest component of the tile assembly 102) is pivotably coupled to the set of linear actuator assemblies 120 within the tile assembly 102 and is thus located at a furthest distance from the base plate 110.

Accordingly, the system 100 includes a kinematic assembly of booms to prevent and/or avoid over constraining the booms, which would otherwise create vibration when the linear actuator assemblies are in motion and to prevent vibration of the linear actuator assemblies. The system 100 also includes a set of damping elements to attenuate vibration of the linear actuator assemblies and prevent transfer of these vibrations into the tile panel of each tile assembly.

For example, each tile assembly 102 includes a set (e.g., three) of linear actuator assemblies 120. Each linear actuator assembly 120 in the set of linear actuator assemblies includes a set of support booms 121, 124 that run through (e.g., slide through, extend through) a linear bearing 132 (e.g., fixed bearing) and a floating bearing 134 (e.g., loose bearing) of a bearing housing 130. The set of support booms 121, 124 are configured to support a driven boom 127, cantilevered from the base plate 110, and to constrain the driven boom 127 in one rotational degree of freedom orthogonal to a length of the driven boom 127. However, the set of support booms 121, 124 may experience friction conditions within the linear and floating bearings over time from repeated movement during actuation of each linear actuator assembly 120 and operation of the system 100.

Thus, the configuration of support booms running in support bearings within a tile assembly 102, the textile sound layer 194 arranged over the support structure 190 of the tile assembly 102, the damper plate 180 that couples proximal lateral links of linear actuator assemblies within the tile assembly 102, and damping blocks coupling each driven boom to the distal lateral links within the linear actuator assembly 120 can cooperate to attenuate and/or eliminate vibrations within the support structure 190 and attenuate vibrations traveling from the actuators into the tile panel 103 of the tile assembly 102.

Therefore, the system 100 includes a set (or "kit") of tile assemblies 102 assemblable onto the support structure 190 to form a dynamic, kinetic sculpture. The tile assemblies include elements and define configurations that attenuate vibrations resulting from actuation, thereby reducing noise generated from vibration of the tile panels and enabling humans to comfortably occupy (i.e., stand within) the support structure 190 while viewing the system 100 in operation.

3. Tile Assembly

Each tile assembly 102 includes: a base plate 110; a tile panel 103; a tile interface 106 coupled to a rear face 105 of the tile panel 103; a set of linear actuator assemblies 120; a local controller 164; a damper plate 180; and/or a bearing mount plate 170 arranged between the tile interface 106 and the base plate 110. The set of linear actuator assemblies 120 are: pivotably coupled to and radially offset above the base plate 110; pivotably coupled to and radially offset above the tile interface 106; and cooperate to constrain the tile panel 103 in angular roll, linear heave, and linear sway motion relative to the base plate 110. The local controller 164 is configured to extend and retract the set of linear actuator assemblies 120 in order to maneuver the tile panel 103 over ranges of angular pitch, angular yaw, and linear surge positions relative to the base plate 110 according to an actuation routine.

3.1 Base Plate

Generally, the base plate 110 is configured to: support and locate the set of linear actuator assemblies 120, a local controller 164, a light element, and/or local power and data connectors; and to fasten to a tile receptacle on the support structure 190, as shown in FIGS. 3-7, 10A, and 10B.

In one implementation, the base plate 110 includes a cast and/or machined aluminum plate. The base plate 110 can also include: a set of (e.g., three) linear actuator assembly 120 pass-throughs configured to pass the distal ends of driven and/or support booms of each linear actuator assembly 120 (described below) in the tile assembly 102. The base plate 110 can also include a set of oversized or keyhole through-bores configured to received threaded fasteners that mount the base plate 110 to a tile receptacle on the support structure 190 and enable positional adjustment of the base plate 110 within the tile receptacle.

In another implementation, the base plate 110 includes an annular light ring 112 arranged about the circumference of the base plate 110, a chassis 114 structure, and is configured to mount to a damper plate 180 via a set of fasteners. The base plate 110 can also include a set of (e.g., three) linear actuator assembly 120 windows configured to pass the distal ends of driven and/or support booms of each linear actuator assembly 120 (described below) in the tile assembly 102, as shown in FIGS. 4, 10A, 10B and 11.

For example, the chassis 114 structure extends from the annular light ring 112 toward proximal ends of a first support boom 121, a second support boom 124, and the driven boom 127 of the set of linear actuator assemblies 120 and includes a set of windows 116 configured to pass distal ends of the first support boom 121, the second support boom 124, and the driven boom 127 of each linear actuator assembly 120 in the set of linear actuator assemblies 120. Each window in the set of windows 116, defines a first diameter (e.g., 2.2 inches, 1.2 inches) greater than a second diameter of the bearing housing 130 (e.g., 2 inches, 1 inch) of a linear actuator assembly 120 in the set of linear actuator assemblies 120.

3.2 Linear Actuator Assembly

In one implementation as shown in FIGS. 4-7, 9A, 9B, 9C, and 11 a linear actuator assembly 120 includes: a driven boom 127 defining a distal end coupled to the tile panel 103 and a proximal end that passes through the base plate 110 and/or the support structure 190; and an actuator 140 that retracts and extends the driven boom 127. For example, the driven boom 127 can include a lead screw, and the actuator can include a gearhead motor 144 that extends and retracts the lead screw by rotating the lead screw within a fixed nut 155 (or by rotating the nut about the lead screw). In another example, the linear actuator assembly 120 includes a linear motor 144 with a slider that forms the driven boom 127. In yet another example, the driven boom 127 includes a linear rack, and the actuator includes a gearhead motor 144 with an output pinion meshed within the linear rack and that extends and retracts the linear rack.

The linear actuator assembly 120 can also include a set of supports configured to support and constrain the driven boom 127 on the base plate 110. In one implementation, the set (e.g., two) of supports includes: a set of support bearings adjacent and rigidly coupled to the actuator; and a set of support booms. Each support boom can: run in a corresponding linear support bearing parallel to the driven boom 127; define a distal end coupled to the distal end of the driven boom 127 by a distal lateral link; define a proximal end coupled to the proximal end of the driven boom 127 by a proximal lateral link 160; and configured to support the driven boom 127—cantilevered from the base plate 110—and to constrain the driven boom 127 in one rotation degree of freedom orthogonal to the length of the boom element.

Figure 8A:
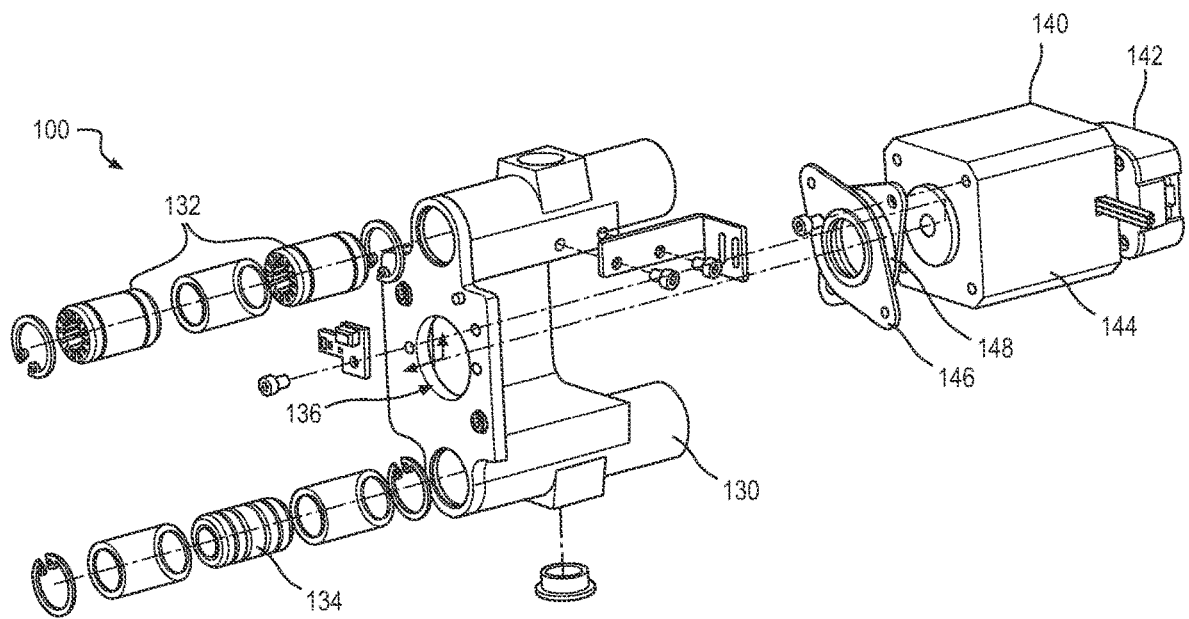
FIGS. 8A and 8B are schematic representations of one variation of the system.
Figure 8B:
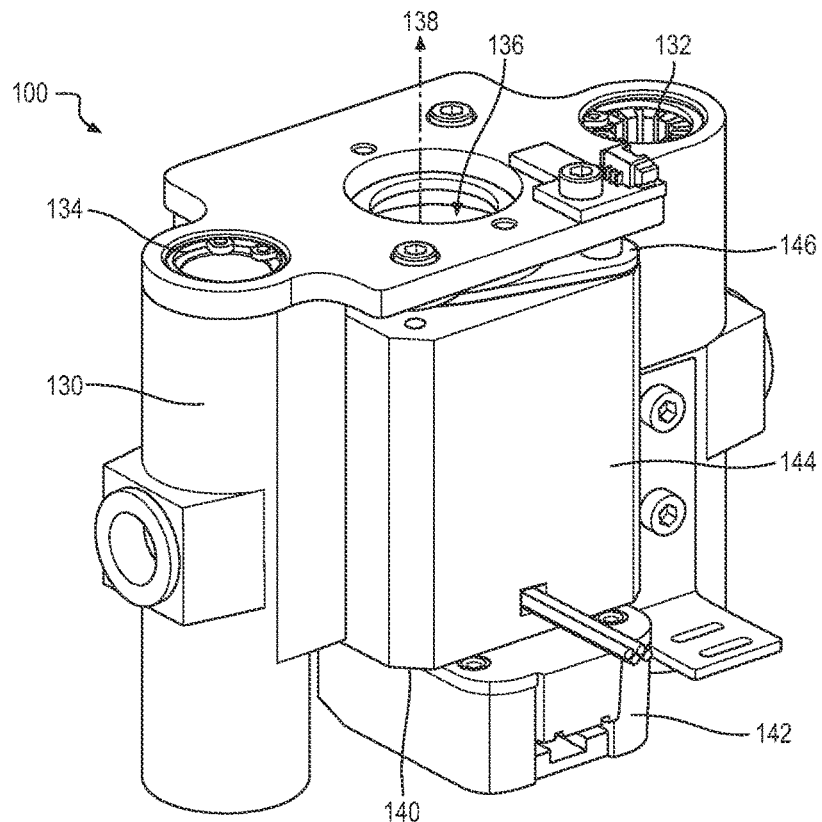

Alternatively, as shown in FIGS. 8A, 8B, 9A, 9B, and 9C the linear actuator assembly 120 can further include a bearing housing 130 that defines a linear bearing 132 (e.g., support bearing, fixed bearing), a floating bearing 134 (e.g., loose bearing), and a through-hole 136 configured to receive the driven boom 127. An actuator 140 is mounted to the bearing housing 130. As shown in FIG. 8B, the actuator includes: a bushing 146 arranged between the actuator and the through-hole 136 of the bearing housing 130; and an elastomeric layer 148 arranged within the bushing 146 and configured to reduce vibration of the actuator during operation. Each support boom can: run in a corresponding bearing (e.g., linear bearing 132, floating bearing 134); define a distal end coupled to the distal end of the driven boom 127 by a distal link; and define a proximal end coupled to the proximal end of the driven boom 127 by a proximal lateral link 160.

In one implementation, the bearing housing 130 can define: a linear bearing 132; a floating bearing 134 parallel to and laterally offset from the linear bearing 132; and a through-hole 136 arranged between the linear bearing 132 and the floating bearing 134. The bearing housing 130 is also configured to pivot on the base plate 110 about a pivot axis perpendicular to the linear bearing 132 and the floating bearing 134. In this implementation, the linear actuator assembly 120 also includes: an actuator 140 mounted to the bearing housing 130; a distal link 150 pivotably coupled to the tile interface 106; a first support boom 121 running through the linear bearing 132 and coupled to a first lateral side 152 of the distal link 150; a second support boom 124 running through the floating bearing 134 and coupled to a second lateral side 154 of the distal link 150 opposite the first lateral side 152; and a driven boom 127. The driven boom 127: runs through the through-hole 136 of the bearing housing 130 and extends through the actuator; is coupled to the distal link 150 between the first lateral side 152 and the second lateral side 154; and is driven linearly parallel to the first support boom 121 and the second support boom 124 by the actuator.

Figure 9A:
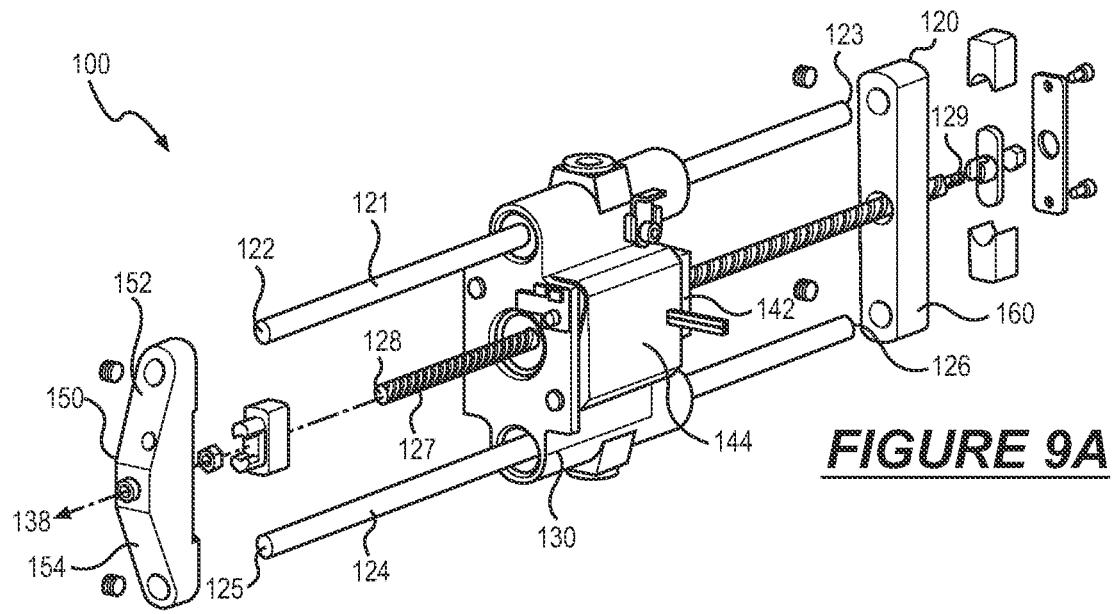
FIGS. 9A, 9B, and 9C are schematic representations of one variation of the system.
Figure 11:
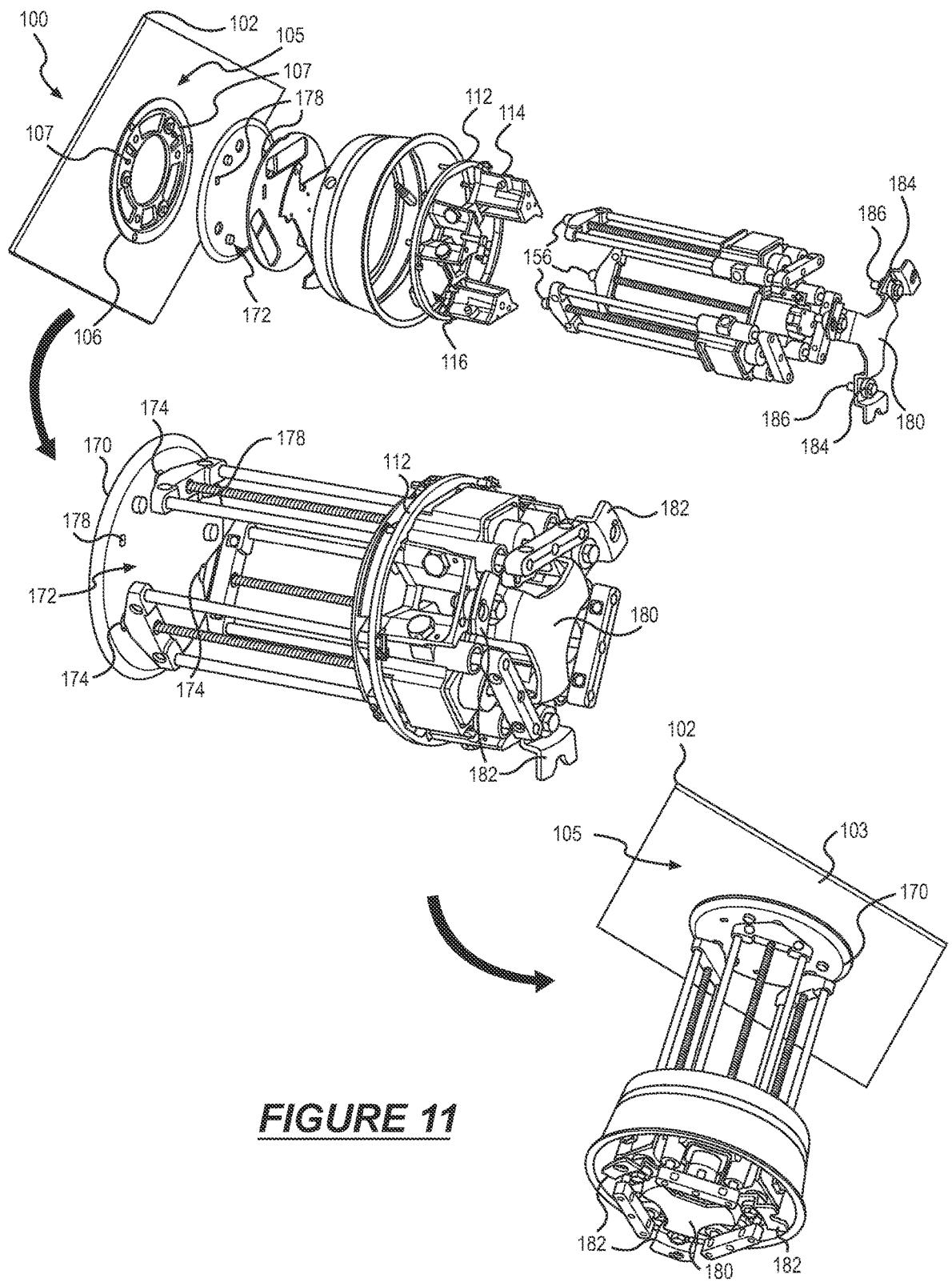
FIG. 11 is a flowchart representation of one variation of the system.

Additionally, the first support boom 121 defines a first end 122 rigidly coupled to the distal link 150 and the second support boom 124 further defines a first end 122 pivotably coupled to the distal link 150. The distal link 150 further includes a pivot ball 156 arranged opposite the first support boom 121, the second support boom 124, and the driven boom 127 and is configured to pivotably couple a linear actuator assembly 120 in the set of linear actuator assemblies 120 to the base plate 110, as shown in FIG. 11. The first support boom 121 and the second support boom 124 are configured to: support the driven boom 127, cantilevered from the base plate 110; and to constrain the driven boom 127 in one rotation degree of freedom orthogonal to a length of the driven boom 127, as shown in FIGS. 9A and 11.

Figure 9B:
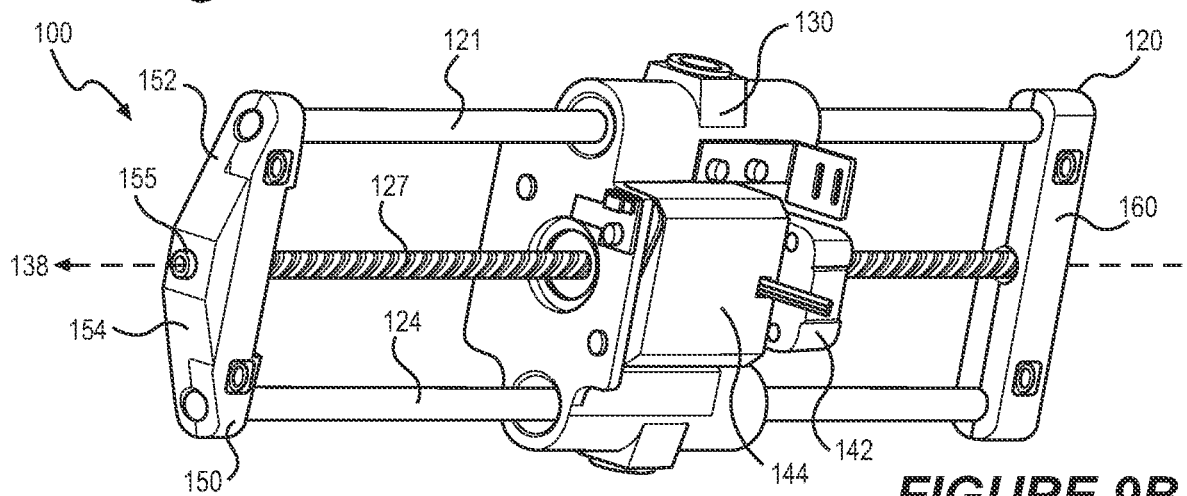
Figure 9C:
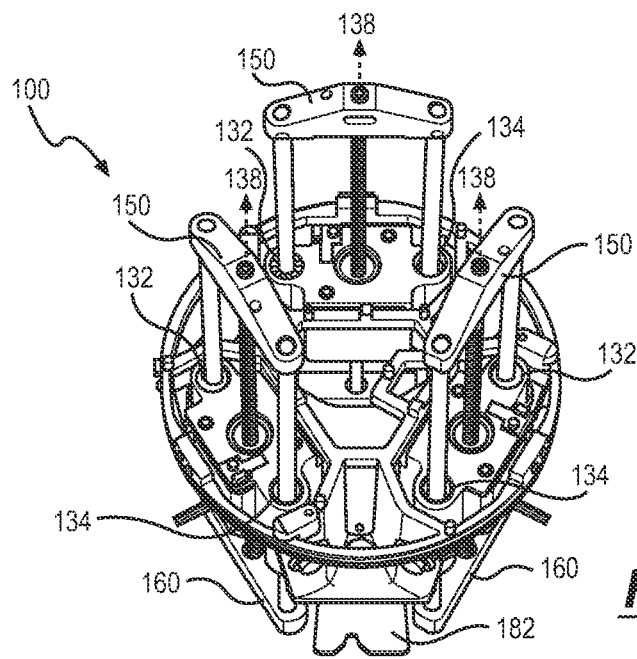

More specifically, each linear actuator assembly 120 in the set of linear actuator assemblies 120 further includes a proximal lateral link 160 arranged opposite the distal link 150 and adjacent a damper plate 180 coupled to the base plate 110. The first support boom 121 further defines the first end 122 rigidly coupled to the distal link 150 and a second end 123 rigidly coupled to the proximal lateral link 160 and the second support boom 124 further defines a first end 122 pivotably (e.g., compliantly) coupled to the distal link 150 and a second end 123 pivotably coupled to the proximal lateral link 160, as shown in FIGS. 9A, 9B, and 9C.

3.2 Actuator-Base Plate Connection

In one variation, the tile assembly 102 can also include an actuator pivot (e.g., a hinge) that pivotably couples the linear actuator and a set of linear support bearings to the base plate 110, thereby enabling the linear actuator, the driven boom 127, the linear support bearings, and the support booms within the linear actuator assembly 120 to pivot on the base plate 110, such as to accommodate changes in effective lengths of the other two linear actuator assemblies 120 in the tile assembly 102. More specifically, a linear actuator and a corresponding set of linear support bearings can be rigidly assembled and pivotably coupled to the base plate 110 via an actuator pivot. The actuator pivot can thus constrain the linear actuator and the set of linear support bearings in three degrees of translation and two degrees of rotation on the base plate 110.

In one example, the tile assembly 102 includes: a first hinge coupled to the base plate 110 at a 0° angular position and extending laterally along a 180° orientation; a second hinge coupled to the base plate 110 at a 120° angular position and extending laterally along a 300° orientation; and a third hinge coupled to the base plate 110 at a 240° angular position and extending laterally along a 60° orientation. In this example, the tile assembly 102 can include three linear actuator assemblies 120, each coupled to the base plate 110 by one hinge in this set.

3.3 Bearing Mount Plate

Figure 5:
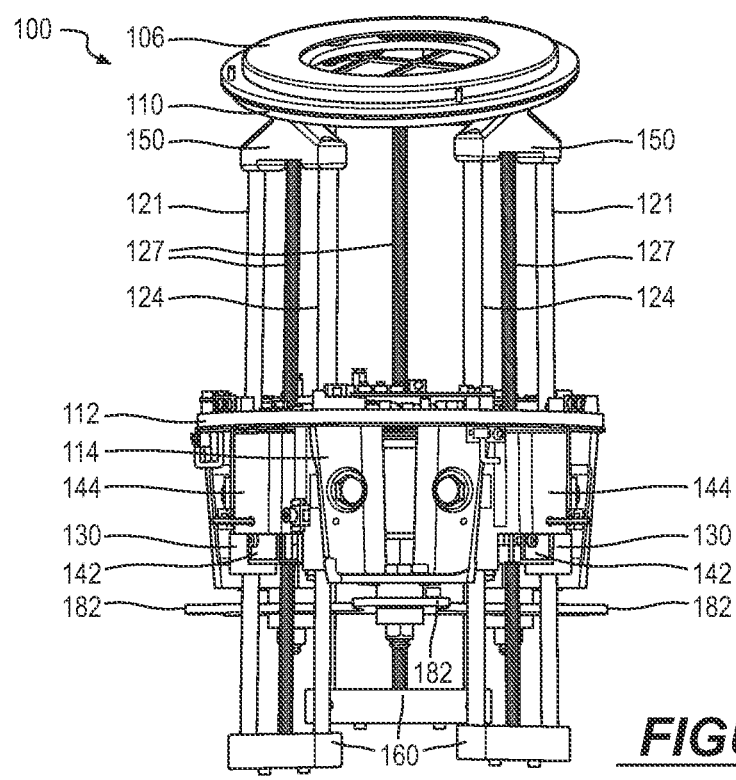
FIG. 5 is a schematic representation of one variation of the system.
Figure 6:
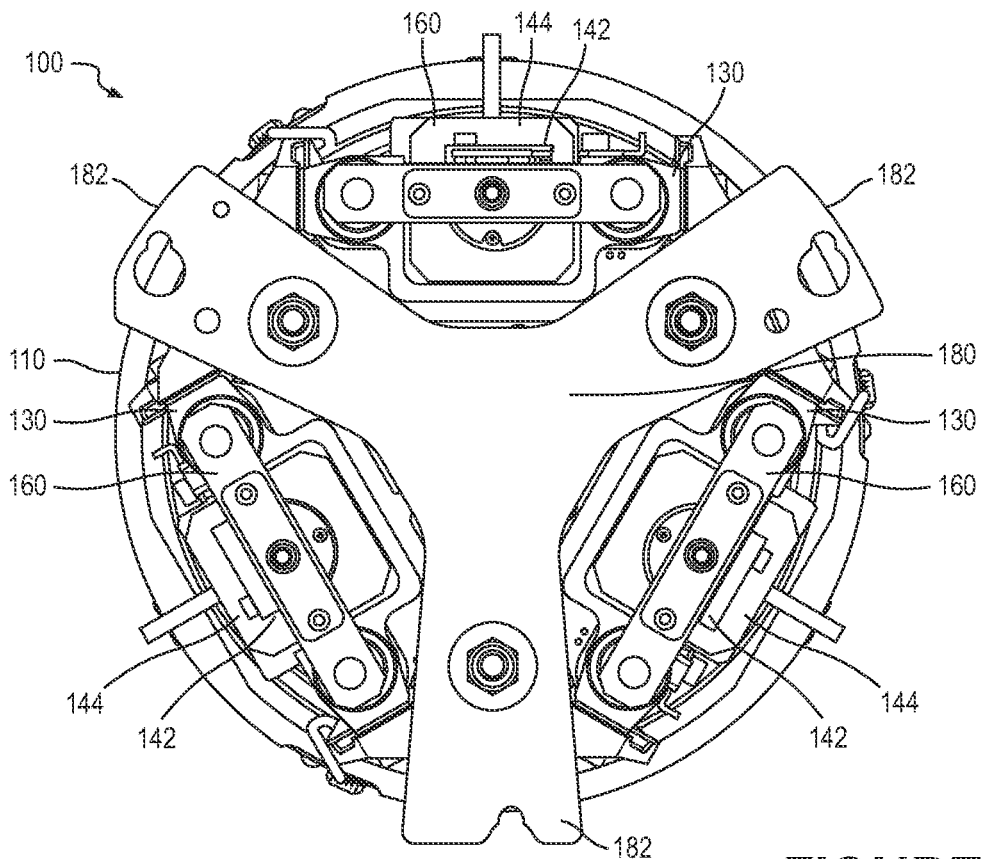
FIG. 6 is a schematic representation of one variation of the system.
Figure 7:
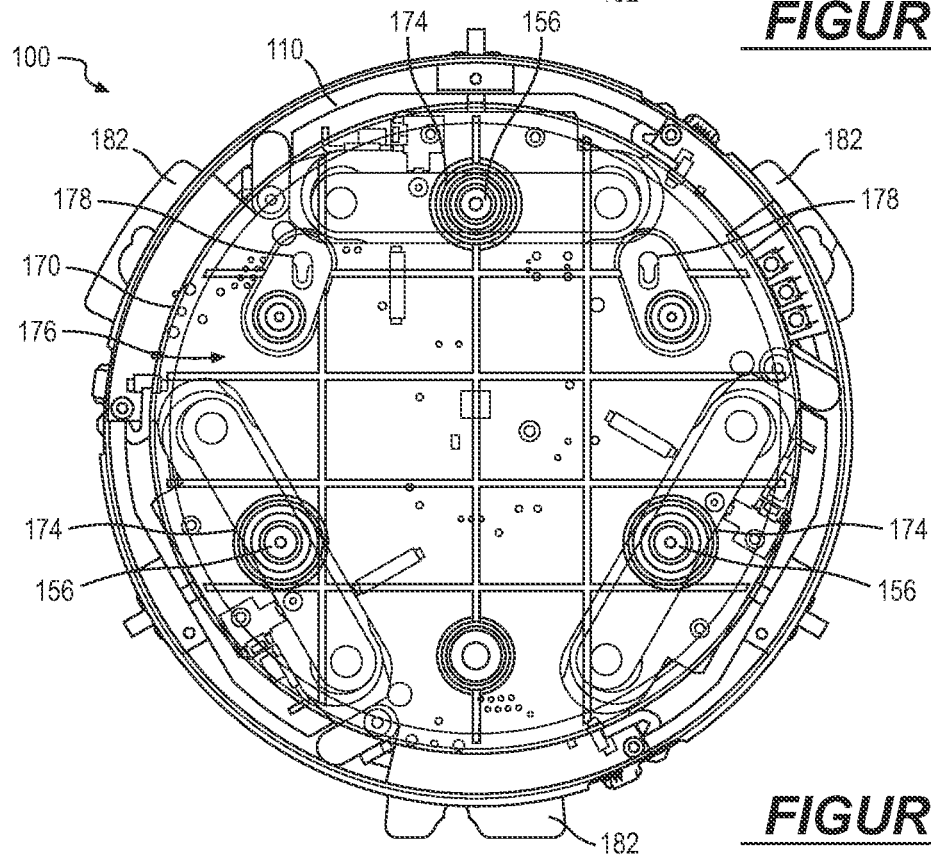
FIG. 7 is a schematic representation of one variation of the system.

In one variation, as shown in FIGS. 5, 7, and 11 the tile assembly 102 also includes a bearing mount plate 170 arranged between the base plate 110 and the tile interface 106. Furthermore, the bearing mount plate 170 is configured to couple distal ends of the linear actuator assemblies 120 to a tile panel 103.

For example, the bearing mount plate 170 defines a coupling face 172 which includes a set of through-bores 174 configured to receive the pivot ball 156 on the distal link 150 of each linear actuator assembly 120, to pivotably (e.g., compliantly) couple distal ends of the set of linear actuator assemblies 120 to the coupling face 172. The bearing mount plate 170 further defines a mounting face 176 arranged opposite the coupling face 172, the mounting face 176 including a set of keyhole through-bores 178 configured to receive a set of eye hooks 107 to mount the set of linear actuator assemblies 120 to the tile interface 106. Thus, each linear actuator assembly 120 can connect to the bearing mount plate 170 and the bearing mount plate 170 can couple the set of linear actuator assemblies 120 to the tile interface 106 to form the tile assembly 102.

3.4 Tile Panel and Tile Interface

As shown in FIGS. 5 and 11, the tile assembly 102 further includes a tile interface 106 configured to couple the bearing mount plate 170 to a tile panel 103 and/or configured to couple distal ends of the set of linear actuator assemblies 120 to the tile panel 103.

In one implementation, a tile panel 103 includes a folded sheet metal structure. For example, the tile panel 103 can define a planar primary face 104 that: forms a polygonal (e.g., triangular, quadrilateral, hexagonal) geometry; includes a set of return flanges extending rearward from edges of the primary face 104; and/or a set of hems on each return flange. For example, the tile panel 103 can include: a polished aluminum, copper, or stainless-steel sheet between 0.030″ and 0.060″ in thickness; a primary face 104 defining an irregular quadrilateral geometry of primary length between 15 and 30 inches and secondary width between 10 and 20 inches; and a 1-inch-deep hemmed return flange.

In one implementation, the tile interface 106 includes an annular ring pivotably coupled to the distal ends of the linear actuator assemblies 120 (e.g., to the distal lateral links of each linear actuator assembly 120 in the tile assembly 102). For example, the tile interface 106 can include a set of (e.g., three) ball ends distributed about a rear face 105 of the annular ring, such as at 0°, 120°, and 240° positions. In this example, each linear actuator assembly 120 can include a distal lateral link: that couples the distal ends of the driven and support booms in the linear actuator assembly 120; and that includes a socket facing outwardly—opposite the driven boom 127—and configured to capture a ball end on the annular ring. Accordingly, the set of ball ends and sockets can cooperate to support and fully constrain the tile interface 106—and therefore the tile panel 103—in six degrees of freedom on the set of linear actuator assemblies 120.

For example, actuation (e.g., extension) of a first linear actuator assembly 120 in the tile assembly 102 can pivot the tile interface 106—and therefore the tile panel 103—about an axis running through the second and third ball ends and sockets. More specifically, actuation (e.g., extension) of the first linear actuator assembly 120 in the tile assembly 102 can pivot the tile interface 106—and therefore the tile panel 103—about an axis parallel to a hinge axis of a first hinge that links the first linear actuator assembly 120 to the base plate 110.

In this implementation, the tile interface 106 can also include: a latch configured to selectively engage and release the rear face 105 of a tile panel 103; and a set of alignment features configured to repeatably angularly locate the tile panel 103 on the annular ring. In one example, the tile panel 103 includes a circular or annular mounting boss bonded, welded, or mechanically fastened to the rear face 105 of the tile panel 103, such as with a center axis of the mounting boss approximately aligned (e.g., coaxial) with the center of mass of the tile panel 103. In this example, the mounting boss can also include: an undercut or dovetail feature defined continuously about the perimeter of the boss; or at a set of (e.g., three) discrete undercut or dovetail features (e.g., a set of angular camlock features) radially-offset about the perimeter of the boss. In this example, the tile interface 106 can include a set of (e.g., two) alignment features and a latch configured to mate with the undercut or dovetail features of the mounting boss and to locate and retain the mounting boss against the tile interface 106.

Furthermore, in this example, the tile assembly 102 can include a pullstring, lever, button, or other latch operator extending from the tile interface 106 toward an edge of the tile panel 103 and configured to operate the latch. Accordingly, a technician may: reach her fingers around this edge of the tile panel 103; find this latch operator; actuate this latch operator to open the latch; and withdraw the tile panel 103 from the tile interface 106, thereby exposing the linear actuator assemblies 120, the base plate 110, and a local controller 164, etc. within the tile assembly 102. The technician may later insert the mounting boss into the annulus of the tile interface 106 and retract the latch operator or press the tile panel 103 toward the tile interface 106 to latch the mounting boss to the tile interface 106, thereby returning the tile panel 103 to the tile assembly 102

In another example, the tile panel 103 includes a set of (e.g., three) mounting pins extending rearward from its rear face 105, such as fastened, bonded, or riveted directly to the rear face 105 of the tile panel 103 or extending rearward from the mounting boss on the rear face 105 of the tile panel 103. In this example, the tile interface 106 can include: a set of pin receivers configured to receive the mounting pins; a latch arranged in one or more pin receivers and configured to retain undercut features on corresponding mounting pins of the tile panel 103; and a latch operator configured to retract the latch(es) and thus release the tile panel 103 from the tile interface 106. Accordingly, in this example, a technician may: reach her fingers around this edge of the tile panel 103; find this latch operator; actuate this latch operator to open the latch; and withdraw the tile panel 103 from the tile interface 106, thereby exposing the linear actuator assemblies 120, the base plate 110, and a local controller 164, etc. within the tile assembly 102. The technician may reverse this process to reinstall the tile panel 103 on the tile interface 106.

In yet another example, the tile interface 106 is configured to couple the bearing mount plate 170 and the set of linear actuator assemblies 120 to the tile panel 103. In this example, the tile panel 103 can define a planar primary face 104 configured to form a polygonal geometry and a rear face 105 opposite the planar primary face 104. The tile interface 106 is arranged on the rear face 105 and includes a set of eye hooks 107 configured to engage the set of keyhole through-bores 178 on the mounting face 176 of the bearing mount plate 170 to mount the bearing mount plate 170 and the set of linear actuator assemblies 120 to the tile panel 103.

Furthermore, in this implementation, the tile interface 106 can define an annulus or other window behind the tile panel 103 to enable a technician to reach through the tile interface 106 toward the base plate 110 of the linear actuator assembly 120, such as to reach the local controller 164, a power and/or data connector, or mounting fasteners on the base plate 110 of the tile assembly 102.

3.5 Constrained Tile Panel Motion

Therefore, the tile assembly 102 can include three linear actuator assemblies 120: pivotably coupled to the base plate 110 and the tile panel 103 and/or the bearing mount plate 170 and the tile panel 103; configured to extend and retract on the base plate 110; and cooperating to constrain the tile panel 103 in six degrees of freedom relative to the base plate 110.

Generally, the three linear actuator assemblies 120 can cooperate to fix the tile panel 103 in three degrees of freedom on the base plate 110, including rotation about a roll axis (e.g., a z-axis of the tile assembly 102); and linear translation perpendicular to the roll axis (e.g., "heave" along a y-axis and sway along an x-axis of the tile assembly 102). The three linear actuator assemblies 120 can also cooperate to locate the tile panel 103 over a range of angular pitch orientations, angular yaw orientations, and linear surge positions relative to the base plate 110.

More specifically, the linear bearing 132 of the bearing housing 130 can be configured to constrain the first support boom 121 of a linear actuator assembly 120 in the set of linear actuator assemblies 120 in four degrees of freedom with angular pitch orientations, angular roll rotations, linear sway positions, and linear surge positions orthogonal to a first length of the first support boom 121. Additionally, the floating bearing 134 can be configured to constrain the second support boom 124 of a linear actuator assembly 120 in the set of linear actuator assemblies 120 in two degrees of freedom with linear sway positions and linear surge positions orthogonal to a second length of the second support boom 124.

Furthermore, the driven boom 127 can define a driven axis 138 offset from a plane defined by axes of the first support boom 121 and the second support boom 124 to form a triangular configuration of the driven boom 127, the first support boom 121, and the second support boom 124 coupled to the distal link 150, as shown in FIGS. 9A, 9B, 9C, and 11.

For example, extending a first linear actuator assembly 120—located in a 0° position on the base plate 110—while maintaining constant effective lengths of the second and third linear actuator assemblies 120 at 120° and 240° positions on the base plate 110 can increase the pitch angle of the tile panel 103 relative to the base plate 110. Similarly, extending the first linear actuator assembly 120 by a first distance, extending the second linear actuator assembly 120 by a second distance twice the first distance, and maintaining a constant effective length of the third linear actuator assembly 120 can increase the yaw angle of the tile panel 103 relative to the base plate 110. Furthermore, extending the first, second, and third linear actuator assemblies 120 can extend the tile panel 103 in the surge direction relative to the base plate 110.

Therefore, the set of linear actuator assemblies 120 (e.g., three) can cooperate to constrain the tile panel 103 in six degrees of freedom relative to the base plate 110 and thus prevent vibration and over constraining of the tile panel 103.

3.6 Nominal Linear Actuator Assembly Position

As described above, the base plate 110 can include a chassis 114 with a set of windows 116 configured to pass the proximal ends of the set of linear actuator assemblies 120.

Generally, in a nominal position, the approximate longitudinal centers of the driven booms 127 in the tile assembly 102 are located within their corresponding actuators such that the proximal ends of the driven booms 127 extend rearward from and behind the base plate 110. Similarly, in this nominal position, the approximate longitudinal centers of the support booms are located within their corresponding linear support bearings such that the proximal ends of the support booms extend rearward from and behind the base plate 110. Accordingly, within this tile assembly, the weights of the proximal ends of the driven booms 127, the proximal ends of the support booms, and the proximal lateral links 160 that couple the proximal ends of the driven and support booms can approximately balance the weights of the distal ends of the driven booms 127, the distal ends of the support booms, the distal lateral links that couple the distal ends of the driven and support booms, the tile interface 106, and the tile panel 103, thereby reducing static and dynamic loads on the actuators and support beams.

3.8 Drop Strap

In one variation, the tile assembly 102 also includes a wire or cable strap: including a first end 122 coupled to the base plate 110 or a linear actuator assembly 120; including a second end 123 coupled to the tile panel 103, such as run through a hole in a hemmed edge of the tile panel 103; and configured to retain the tile panel 103 when the tile panel 103 is removed from the tile interface 106, such as during installation or servicing of the tile assembly 102.

3.9 Local Controller

The local controller 164 of a tile assembly 102 is mounted to the base plate 110 and includes an internal clock and local memory. As described below, the local controller 164 can: cache or store an actuation routine received from a local controller 164 in another tile assembly or from the primary controller 108; and implement open-loop or closed-loop controls to drive the linear actuator assemblies 120 through a sequence of steps, encoder ticks, or effective lengths corresponding to target changes in the angular and translation positions of the tile panel 103 specified in or interpreted from the actuation routine.

For example, the local controller 164 is coupled to the base plate 110, configured to receive an actuation routine from the primary controller 108 and store the actuation routine in local memory, and configured to trigger the linear actuator assembly 120 in the set of linear actuator assemblies 120 to maneuver a tile panel 103, in the set of tile assemblies, over ranges of angular pitch, angular yaw, and linear surge positions according to the actuation routine.

3.9.1 Tile Panel Position Tracking

In one implementation, each linear actuator assembly 120 can further include a linear position sensor, such as including: a scale arranged on the driven boom 127; and a linear optical encoder 142 adjacent or integrated into the actuator. Accordingly, the local controller 164 in the tile assembly 102 can: read the linear position sensor in each linear actuator assembly 120 to track the effective length of each linear actuator assembly 120 (i.e., the distance from the base plate 110 of tile assembly to the distal end of each linear actuator assembly 120) in the tile assembly 102; and then interpret the three-dimensional position of the tile panel 103 on the base plate 110 of the tile assembly 102 during a current refresh cycle based on the effective lengths of these linear actuator assemblies 120.

For example, the linear actuator assembly 120 can further include an optical encoder 142 mounted to the actuator, an optical sensor arranged within the optical encoder 142 and configured to track rotational and linear movement of the driven boom 127 via the optical sensor during operation of a linear actuator assembly 120 in the set of linear actuator assemblies 120. Additionally, the local controller 164 can store a physics model that includes a set of functions or matrices that transform the effective lengths of each linear actuator assembly 120 in the tile assembly 102 into: pitch and yaw orientations of a reference point on the tile panel 103 (e.g., a center of the mounting boss, a centroid of the front face of the tile panel 103) relative to an origin of the tile assembly 102 (e.g., at a center of the base plate 110); and a surge (e.g., a fore and aft, a z-axis) position of the reference point on the tile panel 103 relative to the origin of the tile assembly 102.

Additionally or alternatively, the physics model can include a set of functions or matrices that transform changes in effective lengths of each linear actuator assembly 120 in the tile assembly 102 into: angular pitch and yaw velocities of the reference point on the tile panel 103 relative to the origin of the tile assembly 102; and a surge velocity of the reference point on the tile panel 103 relative to the origin of the tile assembly 102.

In one variation, the local controller 164 can calculate angular pitch, yaw, and surge velocities of the reference on the tile panel 103 based on changes in the pitch, yaw, and surge positions of the reference point over a known time period (e.g., over multiple refresh cycles at the tile assembly 102).

In another variation, the actuator in each linear actuator assembly 120 can include a stepper motor 144, and the local controller 164 can: track steps of each linear actuator from stored nominal or home positions; and then interpret the three-dimensional position of the tile panel 103 on the base plate 110 of the tile assembly 102 during a current refresh cycle based on counts of steps from nominal or home positions of each of these linear actuator assemblies 120. The local controller 164 can also repeat this process to track pitch, yaw, and surge positions and/or calculate pitch, yaw, and surge velocities of the tile panel 103 during operation, such as at a refresh rate of 1 Hz or 10 Hz.

For example, the local controller 164 is configured to interpret a set of effective lengths of a set of linear actuator assemblies in the tile assembly based on rotations of actuators, in the tile assembly, detected by optical sensors in the tile assembly. The local controller 164 is also configured to interpret a three-dimensional position of a tile panel of the tile assembly based on the set of effective lengths of the set of linear actuator assemblies in the tile assembly, the three-dimensional position of the tile panel including a pitch orientation, a yaw orientation, and a surge position of the tile panel.

3.9.2 Tile Panel Actuation

During operation, the local controller 164 can receive an actuation routine from a local controller 164 in an adjacent tile assembly, from a column controller 166 coupled to a cluster or column of tile assemblies in the set of tile assemblies, or directly from the primary controller 108. The local controller 164 can then: read a next target pitch, yaw, and surge position of the tile panel 103 from this actuation routine; or calculate a next target pitch, yaw, and surge position of the tile panel 103 from this actuation routine, such as based on a function defined in the actuation routine and a current time or a last position of the tile panel 103. The local controller 164 can then: implement a physics model or other function to convert this next target pitch, yaw, and surge position into a length of each linear actuator assembly 120, such as relative to nominal or home position; and implement closed-loop controls to drive the linear actuator assemblies 120 in the tile assembly 102 to these lengths. For example, the local controller 164 can: calculate a difference between the current and next target lengths of these linear actuator assemblies 120; and then drive the linear actuator assemblies 120 at speeds proportional to these differences.

In another implementation, the local controller 164: extracts a sequence of predefined (and synchronized) speeds, directions, and durations of motions of each linear actuator assembly 120 in the tile assembly 102 from the actuation routine; and drives the linear actuator assemblies 120 according to these predefined (and synchronized) motions.

4. Vibration+Motion Damping: Damper Plate+Distal Links

In one implementation, the tile assembly 102 further includes a damper plate 180 configured to reduce noise from motion of the set of linear actuator assemblies 120 and from vibration of a tile panel 103 during operation of the set of tile assemblies. The damper plate 180 is arranged about proximal ends of the set of linear assemblies and coupled to the base plate 110 via a set of fasteners, as shown in FIG. 11.

For example, the damper plate 180 can define a set of arms 182 radially extending from the center of the damper plate 180, each arm in the set of arms 182: defines an angular position of 120 degrees relative the set of arms 182 (e.g., 120°, 240°, 360°); is alternately arranged adjacent the proximal lateral link 160 (or proximal end) of a linear actuator assembly 120 in the set of linear actuator assemblies 120; defines a portion of the arm offset by a height of an insulation tube 184; and is configured to mount to the base plate 110 via a set of fasteners through the insulation tube 184 and aligned with a bore hole 186 to receive the set of fasteners. Thus, the damper plate 180 is configured to reduce noise (e.g., via the insulation tube 184) from motion of the set of linear actuator assemblies 120 during operation and configured to attenuate noise (e.g., via the set of arms 182) from vibration of the tile panel 103 in a tile assembly 102 in the set of tile assemblies during operation.

Furthermore, the distal link 150 of each linear actuator assembly 120 can also include a fixed nut 155 (e.g., elastomeric nut) coupled to the driven boom 127 to reduce noise from vibration of each linear actuator assembly 120 and transfer noise to the rear of the linear actuator assembly 120 (e.g., towards proximal link, proximal ends) during operation, as shown in FIG. 9A.

For example, the driven boom 127 can be coupled to a fixed nut 155 arranged within the distal link 150 between the first lateral side 152 and the second lateral side 154 (e.g., opposite the pivot ball 156 configured to couple to the bearing mount plate 170). The fixed nut 155 is configured to reduce noise from vibration of the linear actuator assembly 120 and transfer noise of the tile assembly 102 away from the tile panel 103 (e.g., toward the damper plate 180) during actuation of the driven boom 127.

Therefore, the distal link 150 of each linear actuator assembly 120 reduces noise from vibration of the linear actuator assembly 120 and transfers this noise toward the damper plate 180 of the tile assembly 102 during actuation of the driven boom 127. The damper plate 180 can then attenuate this noise and the noise from vibration of the tile panel 103 during operation of the tile assembly 102, thus enabling a pleasant hearing experience for an external object (e.g., human) within the vicinity (e.g., within a normal sound range of 20-85 Hz).

5. Tile Assembly Configurations

In one variation, a tile assembly 102 can be assembled in a first configuration without a bearing mount plate 170. The first configuration includes: a first tile panel 103; a first tile interface 106; a first base plate 110; a first set (e.g., three) of linear actuator assemblies 120; and a damper plate 180.

For example, in the first configuration: distal ends of a first set of linear actuator assemblies 120 of the first tile assembly 102 run through a first set of windows 116 of a first base plate 110 and are pivotably coupled to a first tile panel 103 via a first set of pivot balls 156; and proximal ends, opposite distal ends of the first set of linear actuator assemblies 120, are arranged about the set of arms 182 of the damper plate 180, the damper plate 180 coupled to the first base plate 110.

In another variation, the tile assembly 102 can be assembled in a second configuration with a bearing mount plate 170 and a damper plate 180. The second configuration includes: a first tile panel 103; a first tile interface 106 coupled to the tile panel; a first bearing mount plate 170 including a mounting face 176 and a coupling face 172 arranged opposite the mounting face; a first base plate 110; a first set (e.g., three) of linear actuator assemblies 120; and/or a damper plate 180.

For example, in the second configuration: the first tile panel 103 is coupled to the first tile interface 106; the coupling face 172 of the first bearing mount plate 170 is pivotably coupled to distal ends of the first set of linear actuator assemblies 120 via the first set of pivot balls 156; proximal ends, opposite distal ends of the first set of linear actuator assemblies 120, are arranged about the set of arms 182 of the damper plate 180, the damper plate 180 coupled to the first base plate 110; and the mounting face 176 of the first bearing mount plate 170 is coupled to the first tile interface 106.

Alternatively, in the second configuration: the first tile panel 103 is coupled to a first tile interface 106; distal ends of a first set of linear actuator assemblies 120 of the first tile assembly 102 run through a first set of windows 116 of a first base plate 110 and are pivotably coupled to the first tile panel 103 via a first set of pivot balls 156; and proximal ends, opposite distal ends of the first set of linear actuator assemblies 120, are arranged about the damper plate 180, the damper plate 180 coupled to the first base plate 110.

Thus, each tile assembly 102 in the set of tile assemblies can be assembled in different configurations such that the tile assembly 102 is coupled to the tile panel 103 via the base plate 110 and/or via the bearing mount plate 170.

5.1 Linear Actuator Assembly Configurations

Figure 10A:
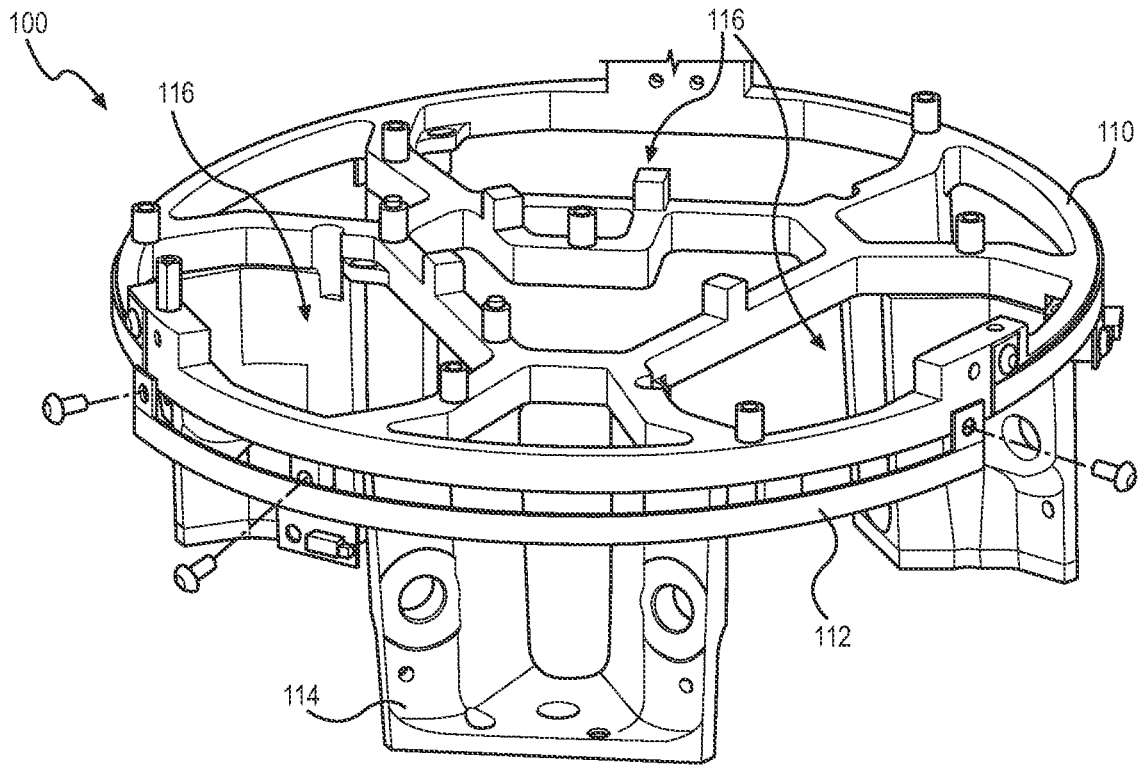
FIGS. 10A and 10B are schematic representations of one variation of the system.
Figure 10B:
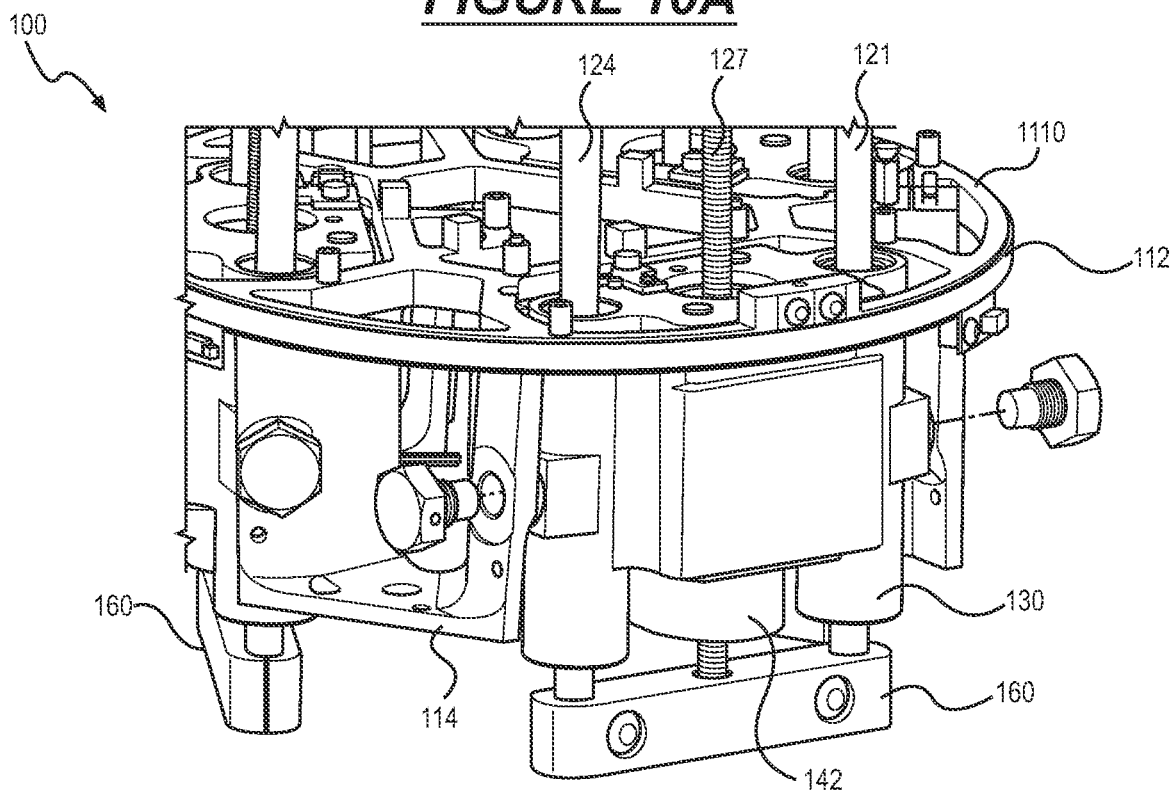

In one variation, the tile assembly 102 can be assembled in a third configuration with a bearing mount plate 170 and a damper plate 180, but the set (e.g., three) of linear actuator assemblies 120 can also be arranged in different configurations—such that each linear actuator assembly 120 is arranged in a particular orientation of the linear bearings 132 and floating bearings 134 of the bearing housings 130—corresponding to a location of a window in the chassis 114 of the base plate 110, as shown in FIGS. 9C and 10A.

For example, in a first configuration, a first linear actuator assembly 120 of the set of linear actuator assemblies 120 is arranged in a first window in the set of windows 116 in the chassis 114 of the base plate 110. The first linear actuator assembly 120 includes: a first support boom 121 arranged in a first fixed bearing; a second support boom 124 arranged in a first floating bearing 134; and a driven boom 127 arranged in a first through-hole 136 of a first bearing housing 130 and between the first linear bearing 132 and the first floating bearing 134. In a second configuration, the second linear actuator assembly 120 of the set of linear actuator assemblies 120 is arranged in a second window of the chassis 114 of the base plate 110. The second linear actuator assembly 120 includes: a first support boom 121 arranged in a floating bearing 134; a second support boom 124 arranged in a linear bearing 132; and a driven boom 127 arranged in the through-hole 136 of a second bearing housing 130 and between the floating bearing 134 and the linear bearing 132. In a third configuration, the third linear actuator assembly 120 of the set of linear actuator assemblies 120 is arranged in a third window of the chassis 114 of the base plate 110 and can exhibit the first configuration of the first linear assembly or the second configuration of the second linear assembly.

Therefore, the set of linear actuator assemblies 120 can be arranged in a window of the chassis 114 with a particular orientation of the linear and floating bearings 132, 134 of the bearing housing 130 to constrain a tile panel 103 in three degrees of freedom.

6. Support Structure

Generally, the support structure 190 defines a rear non-planar surface and an interior non-planar surface 191 that includes an array of tile receptacles 192 distributed across the non-planar surface. The support structure 190 can also include a textile sound layer 194 and an elastomeric sound layer.

For example, each tile receptacle can include: a set of (e.g., three) smooth or threaded bores configured to receive a set of fasteners to mount a base plate 110 of a tile assembly 102; and a set of apertures configured to pass proximal ends of linear actuator assemblies 120 in this tile assembly.

In one implementation shown in FIGS. 1A, 1B, 2, and 3, the support structure 190 includes formed structural steel plates mounted (e.g., welded) to a set of girders to form: a load-bearing semi-spherical dome within a base of a seafaring ship. In this implementation, the set of tile assemblies can be mounted to the interior face of the load-bearing semi-spherical dome to form a concave, multi-pixel, dynamic display and an interior façade over the load-bearing semi-spherical dome. In this implementation, the support structure 190 can define an array of tile receptacles 192 distributed across the interior of the semi-spherical dome and the tile panels 103 of the tile assemblies can be sized to yield a minimum gap (e.g., 1", 5% of the width of a tile panel 103) between adjacent tile panels 103 when the linear actuator assemblies 120 in these tile assemblies are at maximum extension positions across the support structure 190 in order to prevent collision between adjacent tile panels 103 during operation (even with maximum misalignment of these tile assemblies with a specified tolerance on the support structure 190).

Figure 12:
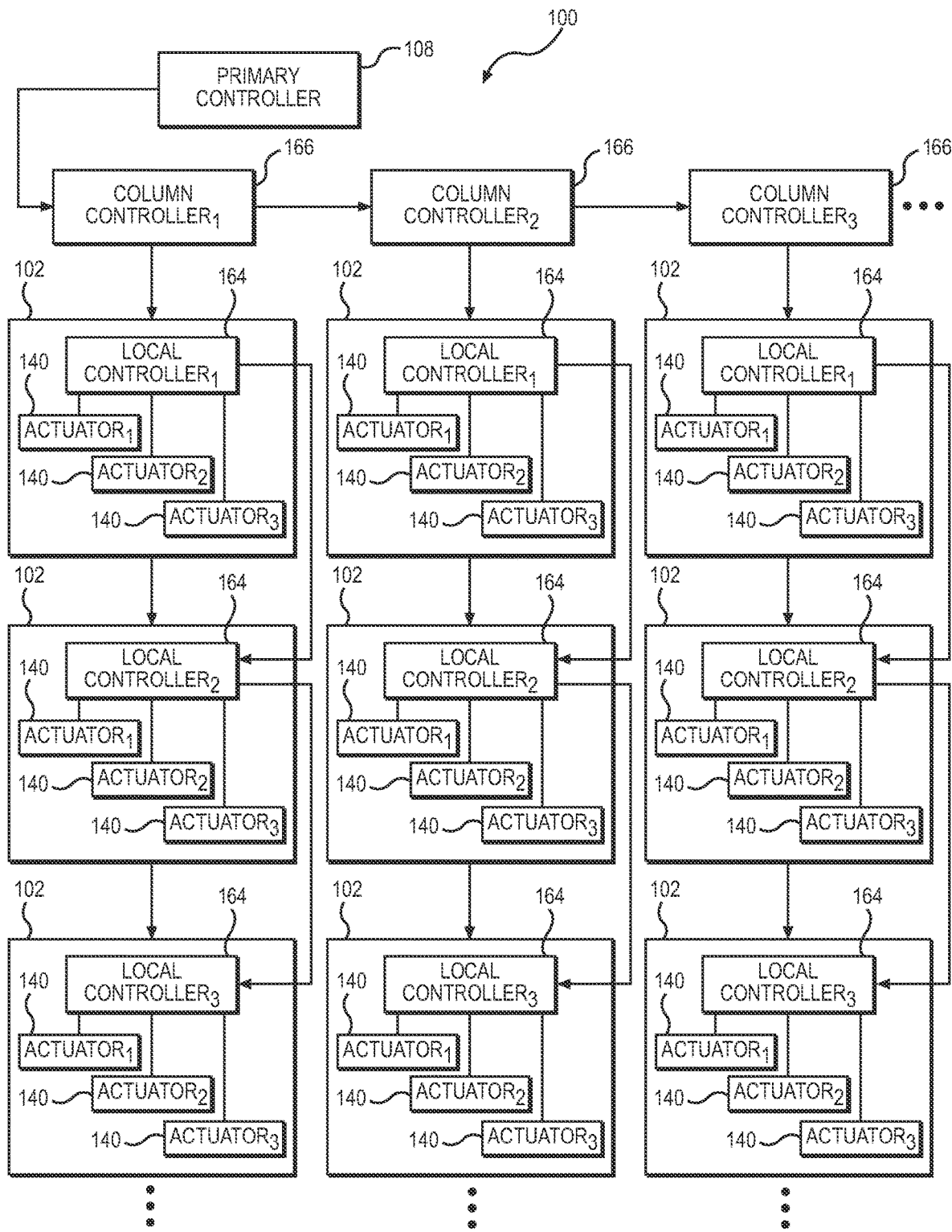
FIG. 12 is an electrical block diagram of one variation of the system.

Furthermore, in this implementation, individual groups of tile assemblies approximating vertical columns within the set of tile assemblies can be connected in series to power supplies and individual column controllers 166, which can be connected to a single primary controller 108, as shown in FIG. 12.

For example, the set of tile assemblies are arranged within a support structure 190 forming a semi-spherical dome. The semi-spherical dome defines an interior non-planar surface 191 and includes an array of tile receptacles 192 distributed across the interior non-planar surface 191. Each tile receptacle in the array of tile receptacles 192 includes: a set of bores configured to receive a set of fasteners to mount the base plate 110 of a tile assembly 102 in the set of tile assemblies; and a set of apertures configured to pass proximal ends of the set of linear actuator assemblies 120 in the tile assembly 102. Additionally, each linear actuator in the set of linear actuator assemblies 120 extends in a maximum distal direction at 0 degrees pitch and 0 degrees yaw to form a target gap (e.g., 1", 5% of the width of a tile panel 103) between edges of adjacent tile panels 103 and to reduce collision between adjacent tile panels 103 in the set of tile assemblies.

6.1 Noise Damping

In one implementation, the support structure 190 further includes a sound insulator (e.g., textile sound layer 194) arranged between the support structure 190 and the tile panels 103 of these tile assemblies. The support structure 190 can also include an elastomeric mounting layer 195 arranged between the textile sound layer 194 and the tile panel 103 of these tile assemblies.

In the foregoing implementation in which the support structure 190 forms a load-bearing semi-spherical dome within a base of a seafaring ship, wool battens or textile sheets can be arranged between the base plates 110 and tile panels 103 of these tile assemblies in order to attenuate: noises from motion of linear actuator assemblies 120 in these tile assemblies; and noises from vibration of the tile panels 103 in these tile assemblies from operation of the ship (e.g., 10 Hz vibrates of the tile panels 103 from operation of engines in the ship). For example, a textile sound layer 194 is arranged on an exterior non-planar surface 193 opposite the interior non-planar surface 191 of the support structure 190 and configured to attenuate sound echoes within the semi-spherical dome. Furthermore, the support structure 190 can include an elastomeric mounting layer 195: arranged about the base plate 110; arranged between the textile sound layer 194 and the tile panel 103 of a tile assembly 102 in the set of tile assemblies; and configured to mount the set of tile assemblies.

Therefore, the textile sound layer 194 and the damper plate 180 of each linear actuator assembly 120 cooperate to reduce noise from motion of each linear actuator assembly 120, from vibration of tile panels 103, and from vibrations of sounds within the semi-spherical dome during operation.

7. Column Controller and Primary Controller

As shown in FIG. 12, a column (or row, a cluster) of tile assemblies in a set of tile assemblies 102 can be connected—in parallel or in series—to a column controller 166, and each column controller 166 in the set of tile assemblies can be connected—in parallel or in series—to a primary controller 108, such as described in U.S. patent application Ser. No. 15/824,244, which is incorporated in its entirety by this reference.

In particular, a column controller 166: can be located between a column or other cluster of tile assemblies, the primary controller 108, and a power supply; can distribute power to this column or cluster of tile assemblies; can receive actuation routines and actuation triggers from the primary controller 108; and can distribute these actuation routines and actuation triggers to corresponding tile assemblies in this column or cluster. In one example, each tile assembly 102 in a column of tile assemblies is connected to a numbered port on the column controller 166 based on a position of this tile assembly in the column. In this example, a column controller 166 receives a set of actuation routines—each labeled with a port number based on a vertical position of a pixel represented by the actuation routine—from the primary controller 108 and outputs each actuation routine to a corresponding port number; each tile assembly 102 thus stores a local copy of its received actuation routine and executes this actuation routine upon receipt of a trigger from the primary controller 108 and/or from the column controller 166.

In another example, tile assemblies in a column (or cluster) of tile assemblies are connected in series—or "daisy-chained" together—with a first tile assembly in the column or cluster connected to (or forming) the column controller 166. In this example, the column controller 166 (or the first tile assembly in the column) receives a set of actuation routines—ordered from the bottom of the column to the top of the column—from the primary controller 108 and distributes the set of actuation routines to the first tile assembly in its column. Upon receipt, the first tile assembly extracts the first actuation routine from this set and passes the remaining, ordered actuation routines to the second tile assembly in the column. The second tile assembly then extracts the first actuation routine in this set and passes the remaining, ordered actuation routines to the next tile assembly in the column. Subsequent tile assemblies in this column repeat this process up to the top tile assembly in the column in order to complete distribution of actuation routines to tile assemblies in the column without necessitating unique identification of tile assemblies in the column.

However, the master, column, and local controllers 164 can implement any other protocol to distribute and store actuation routines in preparation for or during operation.

8. Actuation Routine Generation

A computing device (e.g., a smartphone, a tablet a laptop computer) executing a user portal and/or a remote computer system 100 can interface with a user to generate a set of actuation routines for tile assemblies in the set of tile assemblies.

8.1 Color Video

In one implementation, to generate actuation routines for an set of tile assemblies of tile assemblies, an operator uploads a color video—including multiple frames spanning multiple seconds, minutes, or hours—to the user portal and enters a geometry of the set of tile assemblies at the user portal, such as in the form of: a quantity of tile assembly columns, a quantity of tile assembly rows, a width and height of each tile panel 103, and/or a pitch height and pitch width between adjacent tile assemblies; a spreadsheet of (x, y, z) positions of tile assemblies and the dimensions of their tile panels 103; or a three-dimensional model of planned locations of the set of tile assemblies installed on the support structure 190. The computing device (or a remote computer system 100, etc.) then: generates a three-dimensional map of locations of the tile assemblies in the set of tile assemblies based on data provided by the user; skews and scales the virtual three-dimensional map of tile assembly locations to fill the color video; and assigns individual clusters of pixels in the color video to cospatial tile assembly locations in the skewed three-dimensional map.

The computing device can then convert each cluster of pixels in the color video into an actuation routine defining positions and/or motions of the corresponding tile assembly. For example, for a first cluster of pixels in the video corresponding to a first tile assembly in the set of tile assemblies, the computing device can: define a first sequence of pitch orientations of the first tile assembly based on the average red value in the first cluster of pixels in a sequence of frames in the color video (e.g., by converting average red color values from 0 to 255 to pitch angles between −20° and +20°); define a first sequence of yaw orientations of the first tile assembly based on the average green value in the first cluster of pixels in this sequence of frames in the color video (e.g., by converting average green color values from 0 to 255 to yaw angles between −20° and +20°); define a first sequence of depth position orientations of the first tile assembly based on the average blue value in the first cluster of pixels in this sequence of frames in the color video (e.g., by converting average blue color values from 0 to 255 to depth positions between −5" and +5" from a nominal linear actuator assembly 120 position); and assemble these sequences of pitch, yaw, and depth positions into an actuation routine for the first tile assembly. The computer system 100 can repeat this process for each other tile assembly in the set of tile assemblies and then upload these actuation routines to the primary controller 108 for distribution to the column and local controllers 164 in the set of tile assemblies.

Alternatively, the primary controller 108 and/or column controllers 166 can cooperate to load whole video clips of multiple color frames, sequences of color line scans from video clips, or sequences of individual animated color pixels onto local controllers 164 in tile assemblies within the set of tile assemblies, and these local controllers 164 can implement similar methods and techniques locally to convert color values of their corresponding pixels into target pitch, yaw, and heave positions of their tile panels 103.

8.2 Preexisting Patterns

Alternatively, rather than transform an existing video into a discrete actuation routine for each tile assembly 102, the user portal can prompt the user to select a pattern from a menu of preexisting patterns, such as: a "linear wave" pattern; a "spiral wave" pattern; a "shimmer" pattern; an "earthquake" pattern; or a "snake" pattern." The user portal can also prompt the user to confirm a pattern speed and an actuation duration (e.g., in second, minutes, hours, or days).

The computing device can then: retrieve a sequence of color frames representing the selected pattern; duplicate the sequence of color frames based on the selected actuation duration; and then implement the foregoing methods and techniques to generate an actuation routine for each tile assembly 102 based on these color frames.

8.3 Actuation Routine Contents

In the foregoing implementations, the computing device can generate an actuation routine that specifies, for a tile assembly 102, sequences of: absolute pitch, yaw, and depth positions (e.g., 32-bit representations of angular pitch and yaw offsets in degrees and linear distance offsets from a nominal position); relative angular and linear moves (e.g., 32-bit representations of angular and linear offsets from a last position occupied by a tile assembly 102); angular and linear speeds; angular and linear accelerations; angular and linear decelerations; directions of angular and linear motion; absolute or relative "stop and go" positions; durations of continuous motion periods; durations of stop and go intervals; and/or motion profiles containing the foregoing parameters and spanning durations of time (e.g., multiple seconds, minutes, or hours).

For example, the computing device can generate an actuation routine in the form of a single "frame," which can be uploaded to the primary controller 108 and distributed to a corresponding local controller 164 in one tile assembly in an set of tile assemblies via a column controller 166. The tile assembly 102 can thus load this actuation routine and execute angular and linear positions, speeds, and accelerations over periods of time specified in this actuation routine independently of other tile assemblies in the set of tile assemblies, which concurrently and independently execute their own stored actuation routines.

For example, each tile assembly 102 in the set of tile assemblies can execute its own assigned actuation routine independently of each other tile assembly in the set of tile assemblies over a period of minutes or hours based on an internal clock (e.g., a quartz clock) in the tile assembly 102 and then time-synchronize itself to the primary controller 108—and thus other tile assemblies in the set of tile assemblies—only after loading a new actuation routine minutes or hours later (or only upon receipt of a command to repeat the loaded actuation routine from the primary controller 108 some minutes or hours later).

However, the user portal, the computing device, and/or the remote computer system 100 can generate an actuation routine for each tile assembly 102 in the set of tile assemblies in any other way.

9. Operation

The user may then upload a set of actuation routines to the primary controller 108, such as by physically connecting the mobile device to the primary controller 108, wirelessly transmitting the set of actuation routines from the mobile device to the primary controller 108 or triggering upload of the set of actuation routines from a remote database to the primary controller 108 via a computer network (e.g., the Internet). The primary controller 108 can then distribute these actuation routines to column controllers 166 in the set of tile assemblies, and these column controllers 166 can disperse these actuation routines to their connected tile assemblies as described above, and each tile assembly 102 can store its actuation routine in local memory. Once these actuation routines are loaded onto their corresponding tile assemblies, the primary controller 108 and column controllers 166 can distribute actuation triggers to these tile assemblies responsive to receipt of a command from the technician to begin operation (e.g., via a physical button on the primary controller 108 or via the user portal executing on the computing device connected to the primary controller 108).

Responsive to receipt of an actuation trigger, a tile assembly 102 in the set of tile assemblies can: initiate a first actuation cycle for a duration of time based on the update rate of the set of tile assemblies (e.g., a one-second actuation cycle for a 1 Hz update rate); and implement methods and techniques described above to extract or derive next target pitch, roll, and surge positions from the actuation routine and to drive its linear actuator assemblies 120 according to these target pitch, roll, and surge positions.

10. External Object Contact Detection and Response

In one variation, the local controller 164 in a tile assembly 102 tracks forces applied by the linear actuator assemblies 120 to sweep the tile panel 103 over a sequence of pitch, yaw, and surge positions, such as based on a current draw of the actuators throughout operation. The local controller 164 also interprets an increase in force—such as above a threshold force or mismatched to previous force magnitudes applied by the linear actuator assemblies 120 with the tile panel 103 in a similar position—as contact by an external object (e.g., a human hand or body) or binding within the tile assembly 102. Accordingly, the local controller 164 can: pause execution of an actuation routine currently loaded onto the tile assembly 102 in order to prevent damage to the tile assembly 102 due to application of this external force on the tile panel 103 or internal binding within the tile assembly 102; flag the tile assembly 102 for investigation; and/or intermittently retest actuation of the linear actuator assemblies 120 in the tile assembly 102 to verify that the external force has been removed, such as once per ten-second interval.

Furthermore, in this variation, in response to detecting contact by an external object, the local controller 164 can fully extend the linear actuator assemblies 120 in the tile assembly 102, thereby: maximizing distances between edges of the tile panels 103 in the tile assembly 102 to edges of tile panels 103 in adjacent tile assemblies; and reducing opportunity for pinching the external object between edges of the tile panel 103 and the adjacent tile panels 103.

Alternatively, in response to detecting contact by an external object, the local controller 164 can fully retract the linear actuator assemblies 120, thereby automatically moving the tile panel 103 away from the external object.

11. Proximal Object Detection and Response

In a similar variation, the local controller 164: is electrically coupled to the tile panel 103, such as via a conductive braided wire or flexible PCB; drives the (conductive, metallic) tile panel 103 to a reference voltage potential; reads a capacitance value from the tile panel 103, such as a voltage rise time, a voltage fall or decay time, or a peak voltage; and interprets proximity of an external object to the tile panel 103 based on a difference between this capacitance value and a stored or baseline capacitance value of the tile panel 103. Accordingly, the local controller 164 can selectively retract the linear actuator assemblies 120 in the tile assembly 102 in response to the distance from the tile panel 103 to the external object falling below a threshold distance (e.g., 20"), thereby withdrawing the tile panel 103 from this nearby object and reducing opportunity for collision between the tile panel 103 and the object. For example, the local controller 164 can estimate a combination of the size and proximity of an external object to the tile panel 103 proportional to a difference between a baseline capacitance value stored for the tile panel 103 and a capacitance value read from the tile panel 103 during the current refresh cycle.

The local controller 164 can also: calculate a temporary reference position of linear actuator assemblies 120 to locate the tile panel 103 at a minimum distance to the external object (e.g., 20″) rather than the nominal position—defined near the longitudinal centers of the linear actuator assemblies 120—described above; and continue to execute the current actuation function relative to this temporary reference position rather than the nominal position.

Therefore, the tile panel 103 (e.g., a folded aluminum structure) can function as a capacitive electrode. The local controller 164 can drive and read capacitance values from this tile panel 103/capacitive electrode in a projected self-capacitance configuration; detect proximity of external objects to the tile panel 103 in response to the capacitance value of the tile panel 103 deviating from a stored or baseline capacitance value of tile panel 103; and modify the position and/or motion of linear actuator assemblies 120 in the tile assembly 102 responsive to detecting proximity of such external objects.

Accordingly, the tile assembly 102 can: reduce opportunity for collision between the tile panel 103 and an external object (e.g., a human); cooperate with other tile assemblies within the set of tile assemblies to form a dynamic body that is responsive to objects (e.g., humans) moving in its vicinity; and continue to approximate the positions or motions specified in the actuation routine currently loaded onto the tile assembly 102. Adjacent tile assemblies in the set of tile assemblies can implement similar methods and techniques to detect and respond to proximity of external objects, such as including calculating new temporary reference positions and executing their assigned actuation routines relative to these temporary reference positions, as described above.

Accordingly, a cluster of tile assemblies can: approximately concurrently and independently detect an external object nearby; calculate their own temporary reference positions based on their distances to this external object; and execute their assigned actuation routines, thereby approximating the motions defined by these actuation routines but interpolating their motion around the external object based on a predefined minimum distance between tile panels 103 and external objects.

In this variation, a subset of tile assemblies accessible to humans viewing the set of tile assemblies—such as a bottom six rows spanning a height of up to 10′ from the floor of the set of tile assemblies—can be configured to track capacitance values of their tile panels 103 and to detect proximity of external objects based on these capacitance values. Accordingly, in this variation, these tile assemblies in the bottom rows of the set of tile assemblies can respond to human observers moving within the threshold distance of these tile panels 103 by retracting from these human observers or pausing execution of their actuation routines.

The system loos and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other system loos and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:
1. A tile display comprising:
   a set of tile assemblies, each tile assembly in the set of tile assemblies comprising:
      a base plate;
      a tile panel;
      a tile interface coupled to a rear face of the tile panel; and
      a set of linear actuator assemblies arranged in a radial pattern about the base plate and cooperating to constrain the tile panel in angular roll, linear heave, and linear sway motion relative to the base plate, each linear actuator assembly in the set of linear actuator assemblies comprising:
         a bearing housing:
            defining a linear bearing;
            defining a floating bearing parallel to and laterally offset from the linear bearing;
            defining a through-hole arranged between the linear bearing and the floating bearing; and
            configured to pivot on the base plate about a pivot axis perpendicular to the linear bearing and the floating bearing; and
         an actuator mounted to the bearing housing;
         a distal link pivotably coupled to the tile interface;
         a first support boom running through the linear bearing and coupled to a first lateral side of the distal link;
         a second support boom running through the floating bearing and coupled to a second lateral side of the distal link opposite the first lateral side; and
         a driven boom:
            running through the through-hole of the bearing housing and extending through the actuator;
            coupled to the distal link between the first lateral side and the second lateral side; and
            driven linearly parallel to the first support boom and the second support boom by the actuator; and
   a primary controller configured to trigger sets of linear actuator assemblies in the set of tile assemblies to maneuver tile panels over ranges of angular pitch, angular yaw, and linear surge positions according to an actuation routine.
2. The tile display of claim 1, wherein each tile assembly in the set of tile assemblies further comprises, a local controller:

coupled to the base plate;
configured to receive the actuation routine from the primary controller and store the actuation routine in local memory; and
configured to trigger the linear actuator assembly in the set of linear actuator assemblies to maneuver a tile panel, in the set of tile assemblies, over ranges of angular pitch, angular yaw, and linear surge positions according to the actuation routine.

3. The tile display of claim 1:
wherein the set of tile assemblies comprises a first tile assembly comprising a first set of linear actuator assemblies;
wherein the first set of linear actuator assemblies comprises a first linear actuator assembly comprising:
  a second secondary support boom defines a first end pivotably coupled to a distal link; and
  a first secondary support boom defines a second end rigidly coupled to the distal link, the distal link comprising a pivot ball arranged opposite the first secondary support boom, the second secondary support boom, and a driven boom and configured to couple the first linear actuator assembly to a base plate of a first tile assembly in the set of tile assemblies; and
wherein the first secondary support boom and the second secondary support boom are configured to support the driven boom, cantilevered from a first base plate of the first tile assembly in the set of tile assemblies, and to constrain the driven boom in one rotational degree of freedom orthogonal to a length of the driven boom.

4. The tile display of claim 3, wherein the first tile assembly in the set of tile assemblies further comprises:
a first bearing mount plate:
  defining a coupling face comprising a set of through-bores configured to receive the pivot ball on the distal link of the first linear actuator assembly, to pivotably couple a distal end of the first linear actuator assembly to the coupling face; and
  defining a mounting face arranged opposite the coupling face, the mounting face comprising a set of keyhole through-bores configured to receive a set of eye hooks to mount the first set of linear actuator assemblies to the first tile interface;
a first tile panel defining:
  a planar primary face configured to form a polygonal geometry; and
  a rear face opposite the planar primary face; and
a first tile interface:
  arranged on the rear face; and
  comprising the set of eye hooks configured to engage the set of keyhole through-bores of the first bearing mount plate to mount the first bearing mount plate and the first linear actuator assembly to the tile panel.

5. The tile display of claim 1:
wherein the set of tile assemblies comprises a first tile assembly comprising:
  a first base plate;
  a first tile panel;
  a first tile interface coupled to a rear face of the first tile panel;
  a first set of linear actuator assemblies; and
  a first damper plate coupled to the first base plate; and
wherein the first set of linear actuator assemblies comprises a first linear actuator assembly comprising:
  a first distal link pivotably coupled to the first tile interface;
  a first proximal lateral link arranged opposite the first distal link and adjacent the first damper plate;
  a first secondary support boom:
    defining a first end rigidly coupled to the first distal link; and
    defining a second end rigidly coupled to the first proximal lateral link; and
  a second secondary support boom:
    defining a third end pivotably coupled to the first distal link; and
    a fourth end pivotably coupled to the first proximal lateral link.

6. The tile display of claim 5, wherein the first damper plate further comprises:
defining a set of arms radially extending from the center of the first damper plate, each arm in the set of arms:
  defining an angular position of 120 degrees relative the set of arms;
  arranged adjacent the first proximal lateral link of the first linear actuator assembly in the first set of linear actuator assemblies;
  defining a portion of the arm offset by a height of an insulation tube; and
  configured to mount to the first base plate via a set of fasteners through the insulation tube and aligned with a bore hole to receive the set of fasteners; and
configured to reduce noise from motion of the first linear actuator assembly in the first set of linear actuator assemblies during operation; and
configured to attenuate noise from vibration of the first tile panel of the first assembly in the set of tile assemblies during operation.

7. The tile display of claim 1:
wherein the set of tile assemblies comprises a first tile assembly comprising a first set of linear actuator assemblies; and
wherein each linear actuator assembly in the first set of linear actuator assemblies comprises a driven boom coupled to a fixed nut arranged within a distal link between a first secondary lateral side and a second secondary lateral side of the distal link, the fixed nut configured to reduce noise from vibration of each linear actuator assembly and attenuate transmission of vibration into a tile panel in each tile assembly in the set of tile assemblies during actuation of a driven boom.

8. The tile display of claim 1:
wherein the set of tile assemblies comprises a first tile assembly comprising a first set of linear actuator assemblies; and
wherein the first set of linear actuator assemblies comprises a first linear actuator assembly, the first linear actuator assembly comprising an actuator:
  comprising a motor configured to extend, retract, rotate, and translate a driven boom;
  comprising a bushing arranged between the actuator and a through-hole of a bearing housing; and
  comprising an elastomeric layer arranged within the bushing and configured to reduce vibration of the actuator during operation of the motor.

9. The tile display of claim 1:
wherein the set of tile assemblies comprises a first tile assembly comprising a first set of linear actuator assemblies;
wherein the first set of linear actuator assemblies comprises a first linear actuator assembly, the first linear actuator assembly comprising:

a linear bearing configured to constrain a first secondary support boom of the first linear actuator assembly in four degrees of freedom with angular pitch orientations, angular roll rotations, linear sway positions, and linear surge positions orthogonal to a first length of the first secondary support boom; and a floating bearing configured to constrain a second secondary support boom of the first linear actuator assembly in two degrees of freedom with linear sway positions, and linear surge positions orthogonal to a second length of the second secondary support boom; and wherein the first set of linear actuator assemblies cooperate to constrain a tile panel in each tile assembly in the set of tile assemblies in six degrees of freedom relative to the base plate.

10. The tile display of claim 1:

wherein the set of tile assemblies comprises a first tile assembly comprising a first set of linear actuator assemblies; and wherein the first set of linear actuator assemblies comprises a first linear actuator assembly, the first linear actuator assembly comprising a driven boom defining a driven axis offset from a plane defined by axes of a first secondary support boom and a second secondary support boom to form a triangular configuration of the driven boom, the first secondary support boom, and the second secondary support boom coupled to the distal link.

11. The tile display of claim 1:

further comprising a support structure forming a semispherical dome:

defining an interior non-planar surface;

comprising an array of tile receptacles distributed across the interior non-planar surface, each tile receptacle in the array of tile receptacles:
configured to mount a base plate of a tile assembly in the set of tile assemblies; and
comprising a set of apertures configured to pass proximal ends of a set of linear actuator assemblies in the tile assembly;

wherein the set of tile assemblies are arranged on the interior non-planar surface of the support structure; and wherein each linear actuator assembly in each tile assembly, in the set of tile assemblies, is configured to extend in a maximum distal position at a null-degree pitch position and a null-degree yaw position to form a target gap between a first edge of a first tile panel of the linear actuator assembly and an adjacent edge of a second tile panel of a second linear actuator assembly, adjacent the linear actuator assembly, in the maximum distal position.

12. The tile display of claim 11, wherein the semispherical dome further comprises:

a textile sound layer arranged on an exterior non-planar surface opposite the interior non-planar surface and configured to attenuate sound echoes within the semispherical dome; and a set of elastomeric mounting layers, each elastomeric mounting layer:
interposed between a base of a tile assembly, in the set of tile assemblies, and the interior non-planar surface of the semi-spherical dome; and
configured to attenuate transmission of vibrations from the semi-spherical dome into the base of the tile assembly.

13. The tile display of claim 1:

wherein the first set of tile assemblies comprises a first tile assembly, the first tile assembly comprising a first damper plate configured to attenuate noise from vibration of a first tile panel during operation of the first tile assembly; and wherein, in a first configuration of the first tile assembly:
the first tile panel is coupled to a first tile interface;
distal ends of a first set of linear actuator assemblies of the first tile assembly run through a first set of windows of a first base plate and are pivotably coupled to the first tile panel via a first set of pivot balls; and
proximal ends, opposite distal ends of the first set of linear actuator assemblies, are arranged about the damper plate, the damper plate coupled to the first base plate.

14. The tile display of claim 1:

wherein each linear actuator assembly in each tile assembly, in the set of tile assemblies, further comprises:
an optical encoder mounted to an actuator; and
an optical sensor configured to track rotation of the actuator during operation of the linear actuator assembly; and wherein each tile assembly in the set of tile assemblies further comprises a local controller configured to:
interpret a set of effective lengths of a set of linear actuator assemblies in the tile assembly based on rotations of actuators, in the tile assembly, detected by optical sensors in the tile assembly; and
interpret a three-dimensional position of a tile panel of the tile assembly based on the set of effective lengths of the set of linear actuator assemblies in the tile assembly, the three-dimensional position of the tile panel comprising a pitch orientation, a yaw orientation, and a surge position of the tile panel.

15. The tile display of claim 1, wherein the set of tile assemblies further comprises a first tile assembly, the first tile assembly comprising a base plate:

comprising an annular light ring arranged about the circumference of the base plate; and comprising a chassis structure:
extending from the annular light ring toward proximal ends of a first secondary support boom, a second secondary support boom, and a driven boom of each linear actuator assembly in the set of linear actuator assemblies;
comprising a set of windows:
configured to pass distal ends of the first secondary support boom, the second secondary support boom, and the driven boom of each linear actuator assembly in the set of linear actuator assemblies; and
each window in the set of windows, defining a first diameter greater than a second diameter of a bearing housing of each linear actuator assembly in the set of linear actuator assemblies; and
configured to mount to a damper plate via a set of fasteners.

16. A tile display comprising:

a set of tile assemblies comprising pairs of adjacent tile assemblies, each tile assembly in a pair of adjacent tile assemblies comprising:
a base plate;
a tile panel;
a tile interface coupled to a rear face of the tile panel; and a set of linear actuator assemblies arranged in a radial pattern about the base plate and cooperating to constrain the tile panel in angular roll, linear heave, and linear sway motion relative to the base plate, each linear actuator assembly in the set of linear actuator assemblies comprising:
  a bearing housing:
    defining a linear bearing;
    defining a floating bearing parallel to and laterally offset from the linear bearing;
    defining a through-hole arranged between the linear bearing and the floating bearing; and
    configured to pivot on the base plate about a pivot axis perpendicular to the linear bearing, the through-hole, and the floating bearing; and
  a distal link pivotably coupled to the tile interface;
  a proximal lateral link opposite the distal link;
  a first support boom running through the linear bearing and coupled to a first lateral side of the distal link;
  a second support boom running through the floating bearing and coupled to a second lateral side of the distal link opposite the first lateral side; and
  a driven boom:
    extending through the bearing housing and running through the actuator;
    coupled to the distal link between the first lateral side and the second lateral side; and
    an actuator mounted to the bearing housing and configured to drive the driven boom linearly parallel to the first support boom and the second support boom; and
a primary controller:
  coupled to local controllers in pairs of adjacent tile assemblies; and
  configured to serve sequences of actuation routines to local controllers in the set of tile assemblies to trigger sets of linear actuator assemblies to maneuver tile panels, in the set of tile assemblies, over ranges of angular pitch, angular yaw, and linear surge positions according to sequences of actuation routines.

17. The tile display of claim 16:
wherein the set of tile assemblies comprises a first tile assembly comprising a first tile panel and a first set of linear actuator assemblies; and
wherein each linear actuator assembly, in the first set of linear actuator assemblies, is configured to attenuate transmission of vibrations from actuation of the linear actuator assembly to the first tile panel of the first tile assembly during operation.

18. A tile display comprising:
a set of tile assemblies, each tile assembly in the set of tile assemblies comprising:
  a tile panel;
  a base plate coupled to the tile panel; and
  a set of linear actuator assemblies arranged in a radial pattern about the base plate and cooperating to constrain the tile panel in angular roll, linear heave, and linear sway motion relative to the base plate, each linear actuator assembly in the set of linear actuator assemblies comprising:
    a bearing housing:
      defining a linear bearing;
      defining a floating bearing parallel to and laterally offset from the linear bearing; and
      configured to pivot on the base plate about a pivot axis perpendicular to the linear bearing and the floating bearing; and
    a distal link pivotably coupled to the tile panel;
    a proximal lateral link arranged opposite the distal link;
    a first support boom coupled to the proximal lateral link, running through the linear bearing, and coupled to the distal link;
    a second support boom coupled to the proximal lateral link, running through the floating bearing, and coupled to the distal link;
    a driven boom extending through the bearing housing; and
    an actuator mounted to the bearing housing and configured to drive the driven boom linearly parallel to the first support boom and the second support boom; and
a primary controller configured to trigger sets of linear actuator assemblies to maneuver tile panels, in the set of tile assemblies, over ranges of angular pitch, angular yaw, and linear surge positions according to an actuation routine.

19. The tile display of claim 18, wherein the set of tiles assemblies further comprises a first tile assembly comprising a damper plate:
  coupled to a first base plate of the first tile assembly;
  defining a set of arms radially extending from the center of the damper plate;
  configured to reduce noise from motion of each linear actuator assembly in the set of linear actuator assemblies during operation; and
  configured to attenuate noise from vibration of a tile panel of the first tile assembly in the set of tile assemblies during operation.

20. The tile display of claim 19:
wherein, in a first configuration of the first tile assembly:
  distal ends of a first set of linear actuator assemblies of the first tile assembly run through a first set of windows of a first base plate and are pivotably coupled to a first tile panel via a first set of pivot balls; and
  proximal ends, opposite distal ends of the first set of linear actuator assemblies, are arranged about the set of arms of the damper plate, the damper plate coupled to the first base plate;
wherein the first tile assembly further comprises:
  a first tile interface coupled to the first tile panel; and
  a first bearing mount plate comprising a mounting face and a coupling face arranged opposite the mounting face; and
wherein in a second configuration of the first tile assembly:
  the first tile panel is coupled to the first tile interface;
  the coupling face of the first bearing mount plate pivotably coupled to distal ends of the first set of linear actuator assemblies via the first set of pivot balls;
  proximal ends, opposite distal ends of the first set of linear actuator assemblies, are arranged about the set of arms of the damper plate, the damper plate coupled to the first base plate; and
  the mounting face of the first bearing mount plate coupled to the first tile interface.

* * * * *